United States Patent [19]

Ikuta

[11] Patent Number: 5,268,772
[45] Date of Patent: Dec. 7, 1993

[54] METHOD OF AND APPARATUS FOR OBTAINING HALFTONE IMAGE

[75] Inventor: Kunio Ikuta, Kyoto, Japan

[73] Assignee: Dainippon Screen Mfg. Co., Ltd., Osaka, Japan

[21] Appl. No.: 794,270

[22] Filed: Nov. 19, 1991

[30] Foreign Application Priority Data

Nov. 28, 1990 [JP] Japan ............... 2-331246

[51] Int. Cl.$^5$ .............................................. H04N 1/40
[52] U.S. Cl. ................................ 358/456; 358/454; 358/459; 358/460; 358/465; 358/298
[58] Field of Search ............... 358/454, 455, 456, 458, 358/459, 460, 465, 298

[56] References Cited

U.S. PATENT DOCUMENTS

| | | | |
|---|---|---|---|
| 4,673,971 | 6/1987 | Ikuta et al. | 358/298 |
| 4,926,267 | 5/1990 | Shu et al. | 358/454 |
| 4,942,480 | 7/1990 | Shu | 358/454 |
| 4,977,464 | 12/1990 | Ikuta | 358/456 |
| 4,984,097 | 1/1991 | Shu | 358/455 |
| 5,067,025 | 11/1991 | Kitagawa | 358/456 |

FOREIGN PATENT DOCUMENTS

| | | | |
|---|---|---|---|
| 59-61280 | 7/1984 | Japan | 358/454 |
| 63-16945 | 4/1988 | Japan . | |
| 63-288370 | 11/1988 | Japan . | |

OTHER PUBLICATIONS

"Proceedings of the 18th Joint Conference on Image Technology", Dec. 9, 1962.

*Primary Examiner*—Edward L. Coles, Sr.
*Assistant Examiner*—Kimberly A. Williams
*Attorney, Agent, or Firm*—Loew, Price, LeBlanc & Becker

[57] ABSTRACT

Three or more conversion functions are prepared. Only a part of the conversion functions are extracted therefrom to specify provisional conversion functions. A reference solid-pixel number and imaginary solid-pixel numbers for each provisional conversion function are computed through an imaginary exposure for a quarter halftone-dot block on a scanning line. The imaginary solid-pixel numbers are computed in response to new image signals which are obtained by converting an image signal through the respective provisional conversion functions. Then, each of the imaginary solid-pixel numbers is compared with the reference solid-pixel number, thereby a most-approximate conversion function, which gives a solid-pixel number most approximate to the reference solid-pixel number, is selected among the conversion functions. An exposure control signal is generated by comparing an image signal which is obtained by converting the image signal through the most-approximate conversion function with a corresponding screen threshold value.

36 Claims, 20 Drawing Sheets

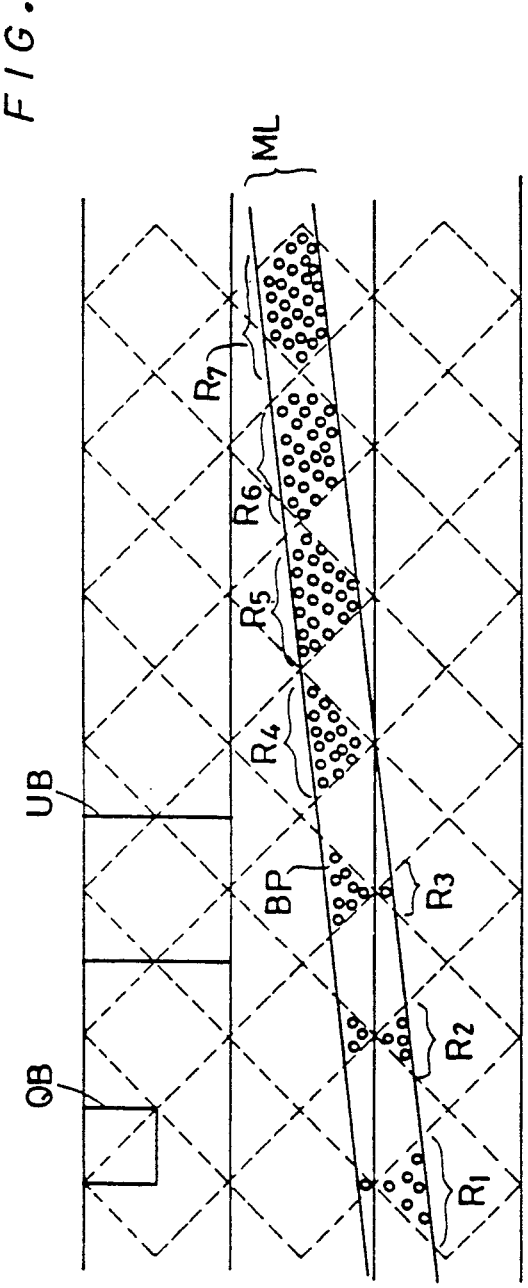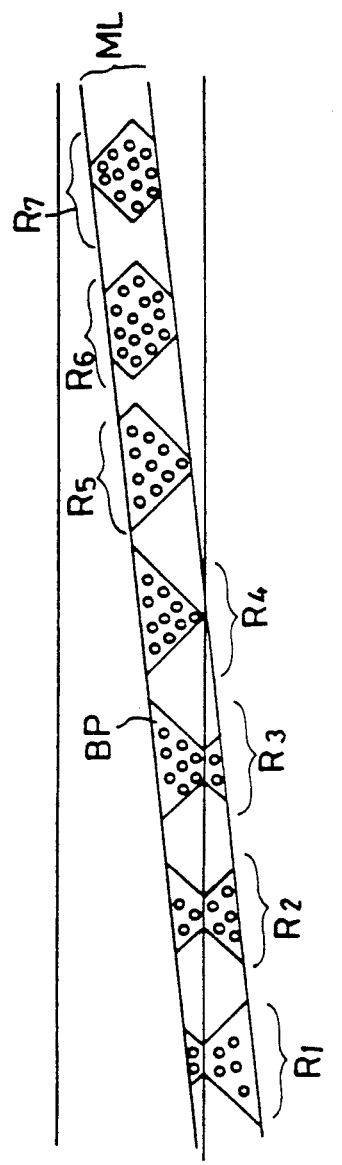

METHOD OF AND APPARATUS FOR OBTAINING HALFTONE IMAGE

BACKGROUND OF THE INVENTION

1. Field of the Invention

The present invention relates to a method of and an apparatus for obtaining a halftone image from an original image having gradation with an image recording apparatus such as a scanner.

2. Description of the Related Art

When it is intended to produce an halftone image from an original image having gradation with an image recording apparatus, moiré may occur due to interference between a regular pattern and a halftone dot, which is well-known. Japanese Patent Laying Open Gazette No. 2-136255 (1990), for example, discloses a method of reducing such moiré.

According to this method, a process is started with preparation of a plurality of conversion functions which are employed in converting a level of either a screen pattern or an image signal. After the level conversion, imaginary solid-pixel numbers to be produced are calculated in response to the corresponding converted signals, where "solid-pixel numbers" means the numbers of recorded pixels which are exposed to light. Each of these imaginary solid-pixel numbers are compared with a predetermined reference solid-pixel number to thereby select one conversion function which gives the imaginary solid-pixel number most approximate to the reference solid-pixel number. Then, one of the screen pattern and the image signal is converted again through the selected conversion function. The converted one is compared with the non-converted one to thereby produce a halftone-dot exposing signal (when the screen pattern is converted, the converted screen pattern is compared with the image signal, for example). According to this method, a halftone-dot block having a prescribed size is divided into a plurality of blocks, and each of these divided halftone-dot blocks is processed individually.

According to the above-described conventional method, a large number of conversion functions (about thirty kinds, preferably) must be prepared in order to obtain a halftone image of a good quality and with less moiré. Either the screen pattern or the image signal is converted through each of these conversion functions, thereafter the corresponding imaginary solid-pixel numbers are computed. Furthermore, comparisons are required between each of the computed imaginary solid-pixel numbers and the reference solid-pixel number. Accordingly, a hardware of a significantly large scale is required in order to carry out this series of processings, that is a problem in the conventional method.

SUMMARY OF THE INVENTION

The present invention is directed to a method of obtaining a halftone image on a photosensitive material, wherein the halftone image consists of recorded pixels exposed to light modulated in response to a control signal.

According to the present invention, the method comprises the steps of: (a) obtaining screen pattern data consisting of threshold values; (b) preparing three or more conversion functions having a predetermined correlation therebetween; (c) selecting only a part of the conversion functions to obtain two or more provisional conversion functions; (d) generating an image signal representing an original image for each pixel; and (e) defining an array of unit areas on the photosensitive material and dividing each unit area into a plurality of divided areas.

Then, counted in the next step (f) is the number of first recorded pixels expected to be obtained in each divided area if the image signal is converted through each of the provisional conversion functions to obtain converted signals and an halftone dot image is recorded on the photosensitive material at a first halftone dot pitch proportional to a size of each unit area through comparison of the converted signals with the threshold values, to thereby obtain number values for respective conversion functions.

Counted in another step (g) is the number of second recorded pixels expected to be obtained in each divided area if a halftone dot image is recorded on the photosensitive material as a function of the image signal at a second halftone dot pitch corresponding to a size of each divided area, to thereby obtain a reference number value.

The method according to the present invention further comprises the steps of: (h) comparing each of the respective number values with the reference number value; and (i) selecting one of the conversion functions for each divided area which is expected to provide recorded pixels in each divided area whose number is most approximate to the reference number value among the conversion functions, wherein the selection of the one of the conversion functions is attained with reference to the result of comparison in the step (h) and the correlation between the conversion functions.

Then, the image signal is converted in the step (j) through the one of the conversion functions to obtain a converted image signal. The converted image signal is compared with the threshold values to obtain the control signal in the step (k); and the photosensitive material is exposed to the light while modifying the light in accordance with the control signal to obtain a halftone dot image on the photosensitive material, in the step (l).

Since the number of recorded pixels which are expected are counted only for the part the conversion functions, i.e., only for the provisional conversion functions according to the present invention, the process of determining the conversion function actually employed for image-recording is simplified and electronic elements for attaining the process are decreased in number. Accordingly, the method of the present invention can be conducted in a relatively simple system for obtaining halftone dot image.

The number of the recorded pixels, which will be called in the following description of a preferred embodiment of the present invention as "solid pixel number", in the actual recording of image is approximate to the reference one, so that contours in the original image are reproduced without breaks therein. The present invention is also advantageous in that moiré can be suppressed in the recorded image.

Preferably, the step (a) comprises the steps of: (a-1) obtaining the screen pattern data as first screen pattern data consisting of first periodic threshold values having a first period proportional to the first halftone dot pitch; and (a-2) obtaining second screen pattern data consisting of second periodic threshold values having a second period proportional to the second halftone dot pitch.

In this case, the step (f) may comprise the steps of: (f-1) converting the image signal through respective provisional conversion functions to obtain converted provisional image signals; and (f-2) comparing the converted provisional image signals with the first periodic threshold values in each divided area to obtain the respective number values.

Correspondingly, the step (g) may comprise the step of: (g-1) comparing the image signal with the second periodic threshold values in each divided area to obtain the reference number value.

In a preferred embodiment of the present invention, conversion lines representative of the conversion functions are defined in a rectangular region having four apexes of:

(0, 0), (0, A), (A, 0) and (A, A)

on a two-dimensional conversion coordinate plane such that each conversion lines connects diagonal two apexes within the four apexes, where A is a non-zero value.

The conversion lines may be such that the conversion lines intersect a straight line connecting the diagonal two apexes, wherein respective intersections of the conversion lines and the straight line are aligned on the straight line at a same interval.

Preferably, the conversion lines representative of the conversion functions consist of a straight conversion line connecting the diagonal apexes, and one or more pairs of conversion curves connecting the diagonal two apexes, wherein each pair of conversion curves are substantially symmetrical with respect to the straight line.

When the symmetrical conversion curves are employed, moiré is further effectively suppressed.

Accordingly, an object of the present invention is to provide a method and an apparatus with which scale of a hardware can be reduced.

Another object of the present invention is to provide a method and an apparatus with which a halftone image with extremely less moiré can be produced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11A illustrates exposure wherein conversion is not performed;

FIG. 11B illustrates exposure wherein conversion is performed;

DESCRIPTION OF THE PREFERRED EMBODIMENTS

A. Overall Structure and Outline of the Function

Figure 2:
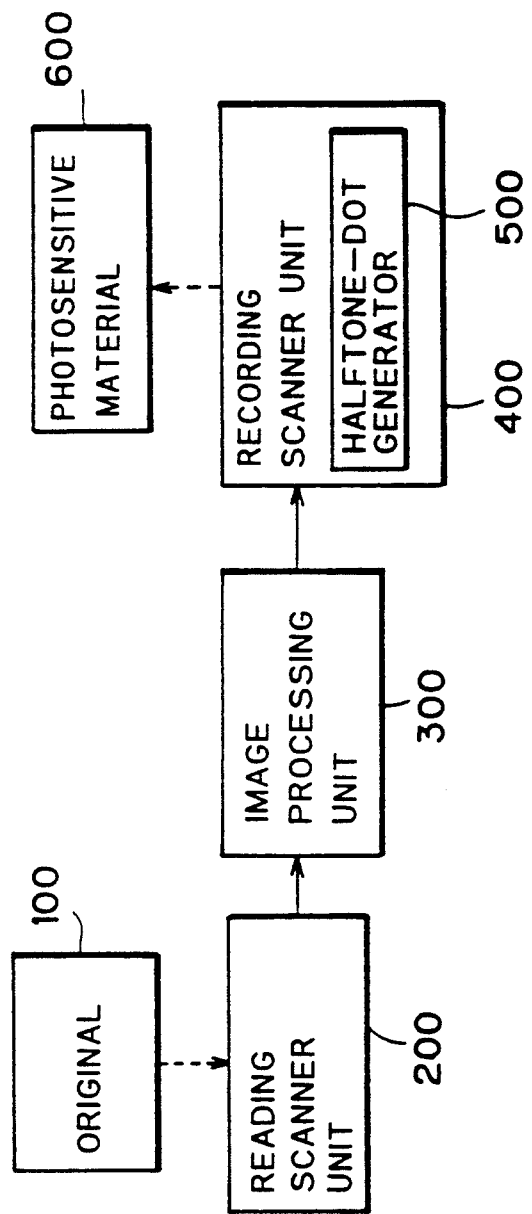
FIG. 2 is a schematic block diagram showing the scanner.

FIG. 2 is a schematic block diagram showing a scanner to which a preferred embodiment of the present invention is applied. In the figure, an image of an original 100 is read for each pixel by a reading scanner unit 200. An image signal thus obtained is transferred to an image processing unit 300. The image processing unit 300 performs processings such as gradation setting and contour enhancement on the inputted image signal. After the processing, the processed image signal is led to a recording scanner unit 400. The recording scanner 400 comprises a halftone-dot generator 500 of which function will be described later. The recording scanner unit 400 performs processings, which will be also described later, on either image signal or a screen threshold pattern, and thereafter converts the image signal into a halftone-dot signal. In response to the halftone-dot signal, the recording scanner unit 400 records a halftone image on a photosensitive material (a surface-to-be-scanned) 600 by exposing the photosensitive material 600.

Figure 1:
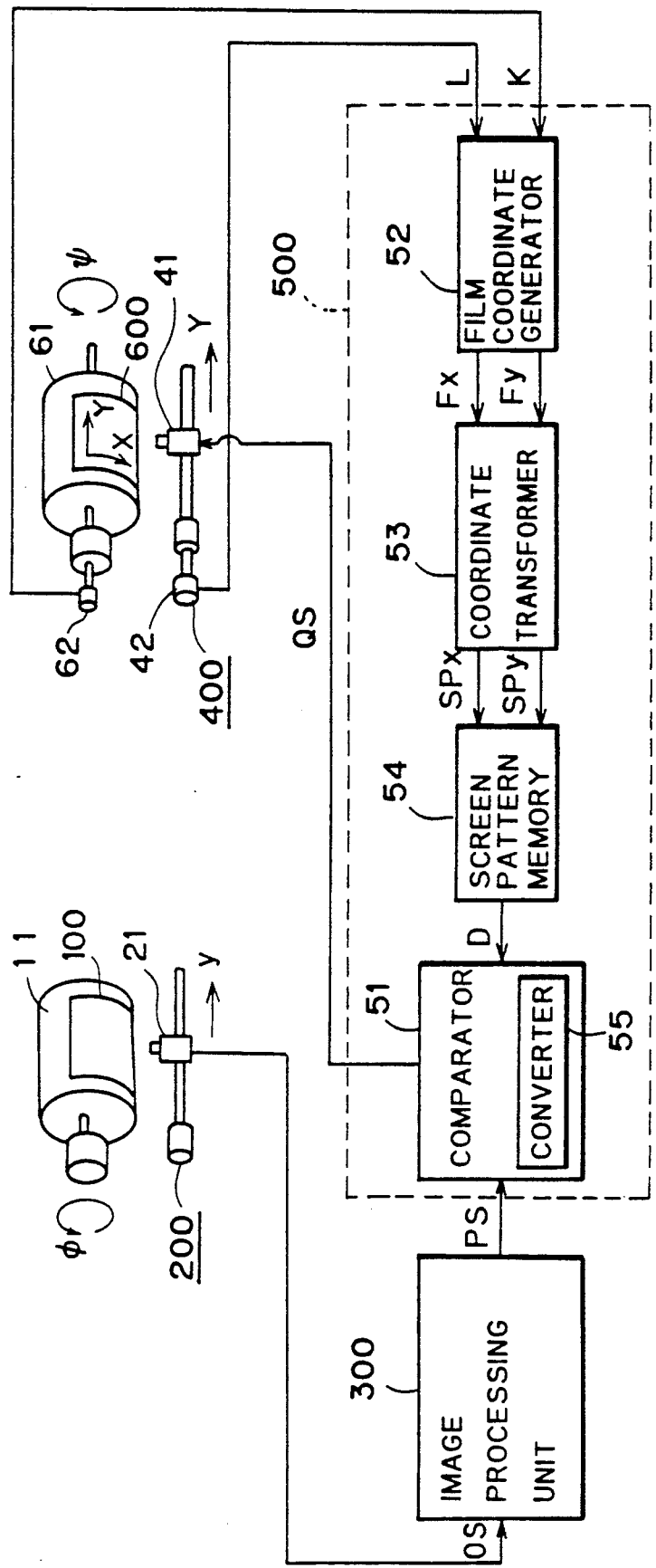
FIG. 1 shows a structure of a scanner in accordance with a preferred embodiment of the present invention.

FIG. 1 illustrates respective detail structures of the above-described blocks shown in FIG. 2. An original 100 is mounted on an original drum 11, so that it is rotated in the direction $\phi$. A scanning head 21 moves in the direction Y so as to scan the original 100 for each scanning line, thereby an image signal OS is obtained. The image signal OS is led to an image processing unit 300 to be subjected to prescribed processings therein such as color correction and gradation setting, and thereafter outputted as a processed image signal PS.

The processed image signal PS is inputted in a comparator 51 in the halftone-dot signal generator 500 to be subjected to a conversion processing, which will be described later, and thereafter outputted as an exposure control signal QS. While moving in the direction Y, a recording head 41 modulates an exposure beam for recording in response to the exposure control signal QS. Then, the recording head 41 radiates the modulated exposure beam on the photosensitive material 600 which is mounted on a recording drum 61 and rotated in the direction ψ.

The conversion processing conducted during this exposure will be now described. A rotary encoder 62 is coupled to the recording drum 61, and outputs a position signal K concerning a main scanning direction X. Another rotary encoder 42 is coupled with a feed screw which moves the recording head 41, and outputs a position signal L concerning to a subscanning direction Y.

Both the position signals K and L are inputted in a film coordinate generator 52 in the halftone-dot generator 500, and outputted as film coordinates $F_x$, $F_y$, respectively, which indicate the position of a pixel subjected to exposure on the photosensitive material 600. The film coordinates $F_x$, $F_y$ are inputted to a coordinate transformer 53 to be subjected to coordinate transformation, which will be described later. This coordinate transformation is required for setting a screen angle. The film coordinates $F_x$, $F_y$ are transformed to be outputted as screen pattern coordinates $SP_x$, $SP_y$. The screen pattern coordinates $SP_x$, $SP_y$ serve as address signals in accessing a screen pattern memory 54.

A screen threshold value D is read out from the screen pattern 54 of which address has been assigned, and is inputted to the comparator 51. A converter 55 is provided in the comparator 51, and converts either the screen threshold value D or the above-described processed image signal PS. This conversion processing will be described later. Then, the threshold value D is compared with the processed image signal PS (either one has been converted), and thereafter the exposure control signal QS is outputted in response to the comparison result, as described above.

B. Coordinate Transformation

The coordinate transformation performed in the above-described processings will be now described. In the film coordinate generator 52, the film coordinates $F_x$, $F_y$ are obtained in response to the position signals K and L. Respective single scales of the film coordinate axes $F_x$, $F_y$ correspond to a single-side length P of an exposure pixel PX. The exposure pixel of a square shape is shown in FIG. 3A.

When the film coordinates $F_x$, $F_y$ are transformed into the screen pattern coordinates $SP_x$, $SP_y$ in the coordinate transformer 53, the coordinate axes are rotated in order to set a screen angle. FIGS. 3A to 3C illustrates a series of coordinate transformation operations.

Figure 3A:
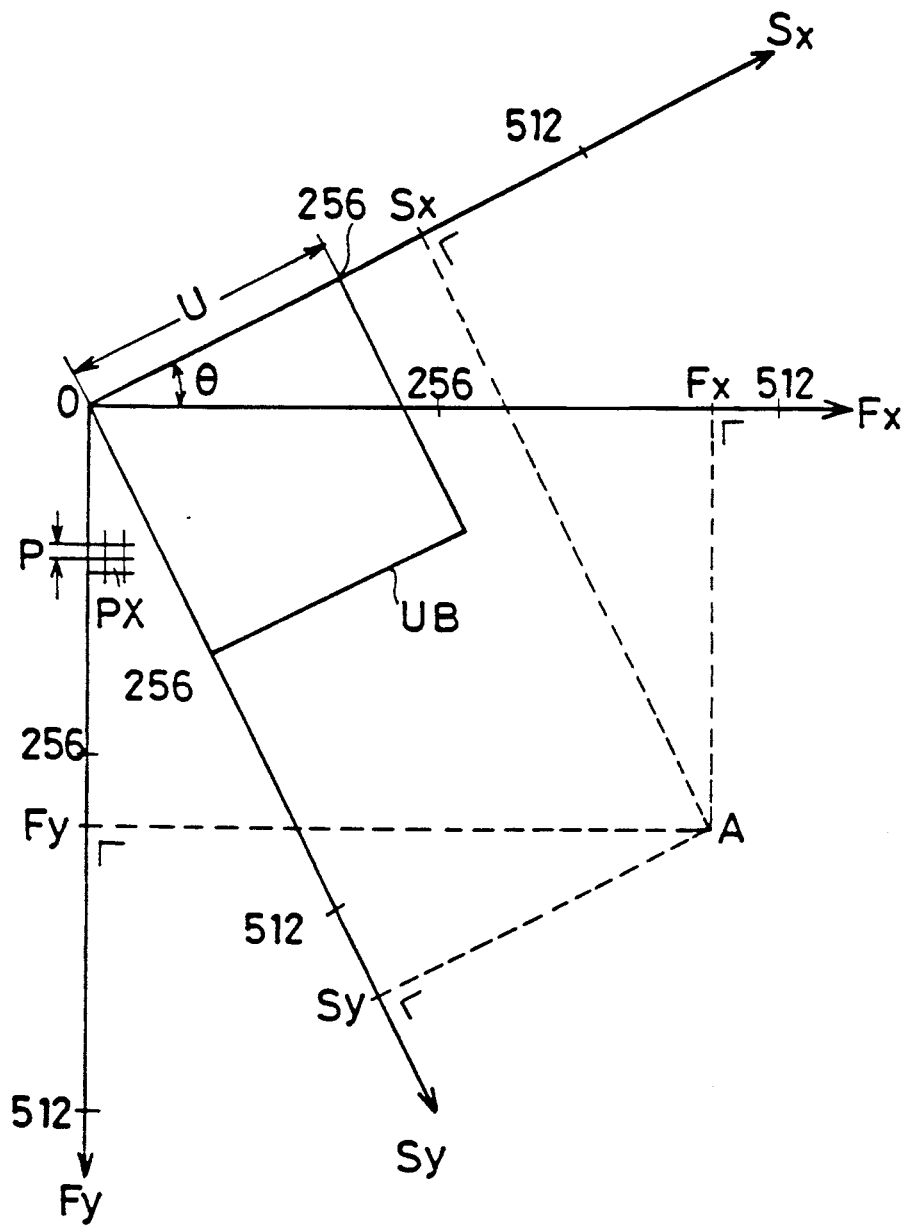
FIGS. 3A to 3C are explanatory views illustrating coordinate transformation.
Figure 3B:
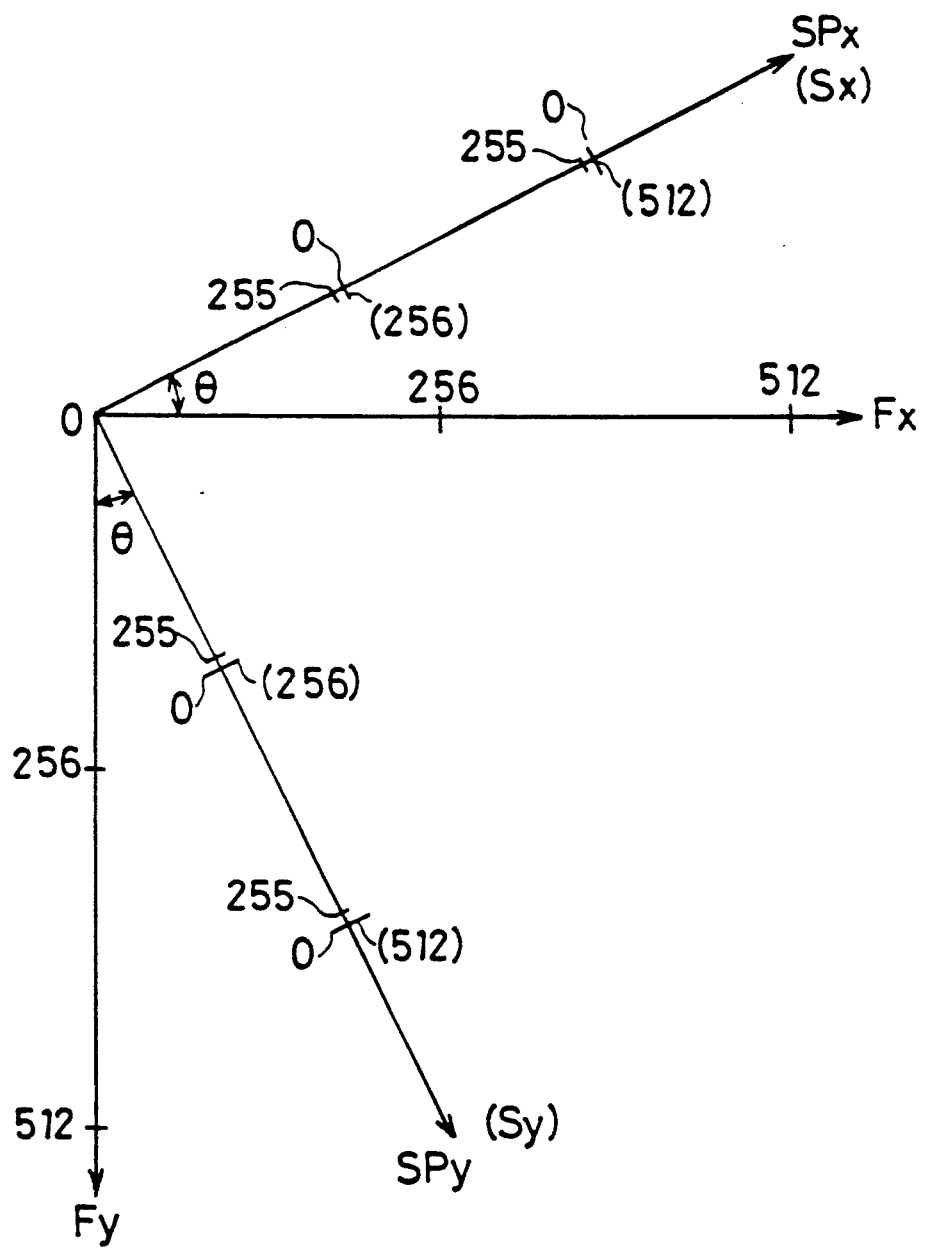
Figure 3C:
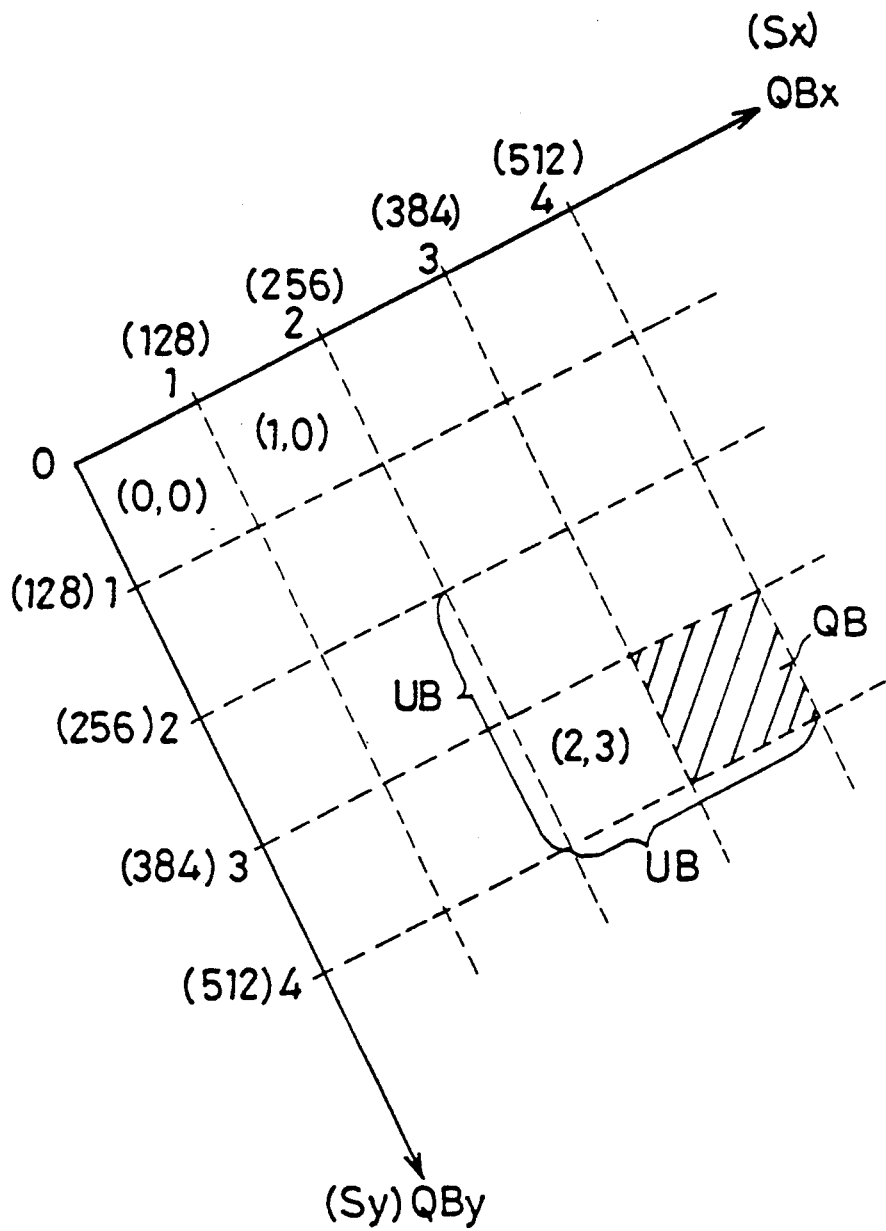

Referring to FIG. 3A, the film coordinates $F_x$, $F_y$ are transformed into screen coordinates $S_x$, $S_y$. The film coordinate axes $F_x$, $F_y$ and the screen coordinate axes $S_x$, $S_y$ have a common origin, and the latter are shifted from the former by an angle $\theta$.

An array of unit areas or unit blocks UB is defined on the screen coordinates $S_x$, $S_y$. The single-side length of each unit block UB on the screen coordinates $S_x$, $S_y$ corresponds to $2^8 = 256$ scales. This unit block UB corresponds to a unit halftone-dot block on the surface-to-be-scanned employed in exposure. A symbol U is defined for expressing the single-side length of the unit halftone-dot block UB.

Coordinate transformation from the film coordinates $F_x$, $F_y$ to the screen coordinates $S_x$, $S_y$ can be achieved by rotating the coordinate axes by the angle $\theta$ and contracting or extending the axes. It is well known that the screen coordinates $S_x$, $S_y$ are given by the following equation (1):

$$S_x = (F_x \cos\theta - F_y \sin\theta) \times (P \times U/256) \brace S_y = (F_x \sin\theta + F_y \cos\theta) \times (P \times U/256)} \quad (1)$$

In addition, letting $$a = \cos\theta \times (P \times U/256)$$

and $$\beta = \sin\theta \times (P \times U/256),$$

thereby the following equation (2) is obtained:

$$S_x = F_x \cdot a - F_y \cdot \beta \brace S_y = F_x \cdot \beta + F_y \cdot a} \quad (2)$$

As shown in FIG. 3B, the screen coordinates $S_x$, $S_y$ are then transformed to the screen pattern coordinates $SP_x$, $SP_y$. The screen pattern coordinates $SP_x$, $SP_y$ are defined within a single unit halftone-dot block UB. Therefore, the screen pattern coordinates $SP_x$, $SP_y$ have coordinate values in the range between 0 and 255. The coordinate values are regularly repeated in this range on the screen coordinates $S_x$, $S_y$. When A is divided by B, the remainder is expressed by A·modB, wherein the screen pattern $SP_x$, $SP_y$ are given by the following equation (3):

$$SP_x = S_x \cdot \mathrm{mod}\ 256 \brace SP_y = S_y \cdot \mathrm{mod}\ 256} \quad (3)$$

Furthermore, as shown in FIG. 3C, quarter halftone-dot blocks (divided areas) QB are defined, in which each quarter halftone-dot block QB has a size equal to one-fourth the size of the unit halftone-dot block UB. The quarter halftone-dot block QB can be obtained by dividing the unit halftone-dot block UB into four squares congruous to each other.

Coordinates $QB_x$, $QB_y$ of the quarter halftone-dot block QB are obtained by disregarding the least significant seven bits of the screen coordinates $S_x$, $S_y$ and by basing the more significant bits thereof, i.e., the eighth bit and more, as shown in FIG. 3C.

The conversion transformation in the coordinate transformer 53 is completed through the above-described procedure.

C. Processing Procedure

Figure 4:
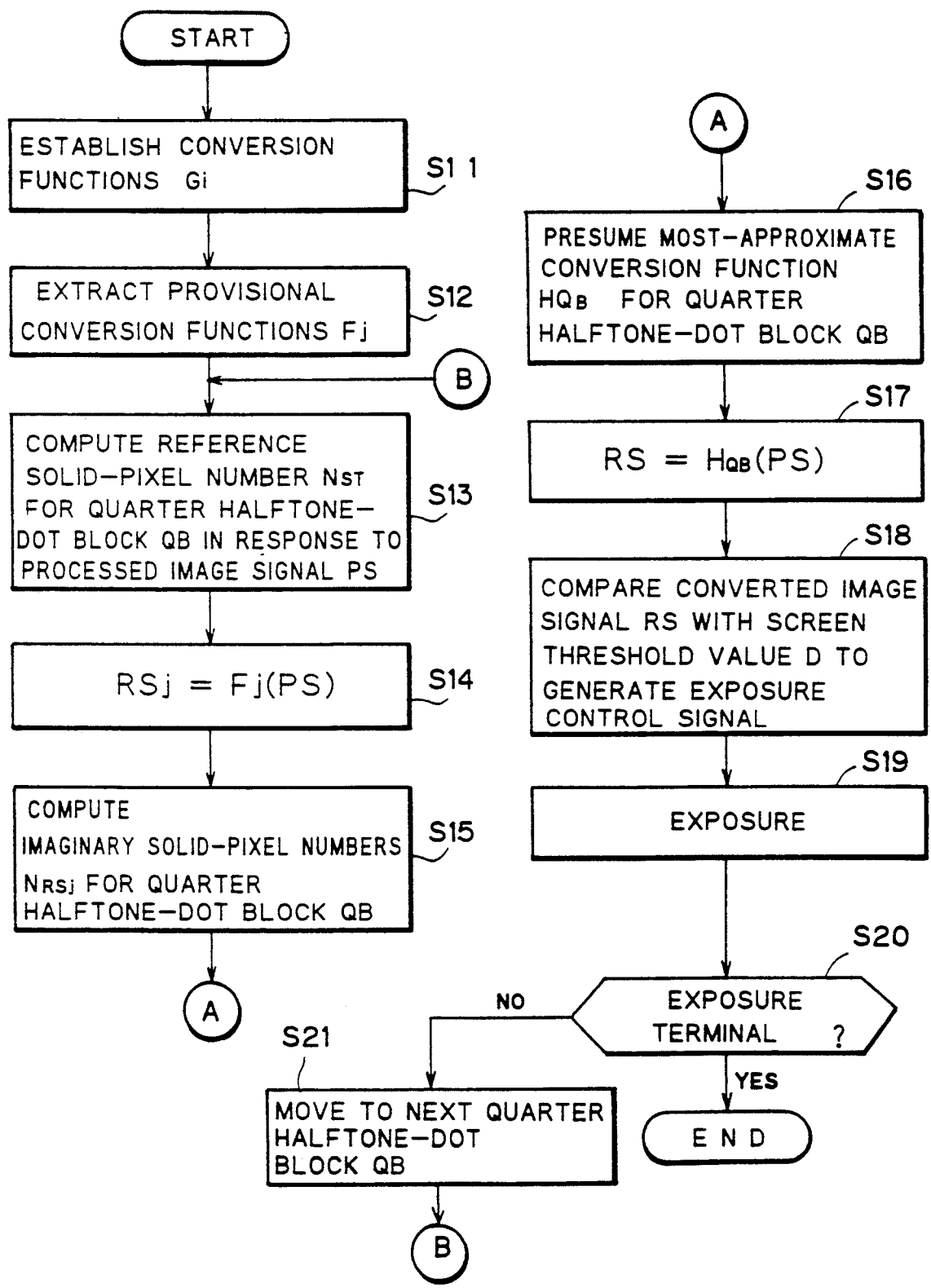
FIG. 4 is a flow chart showing the procedure of a method of producing a halftone image in accordance with the preferred embodiment of the present embodiment.

Processing procedure in the converter 55 is now described. FIG. 4 is a flow chart showing the procedure in the processings of converting a processed image signal PS into a converted image signal RS through actually conducting an exposure processing.

Figure 5A:
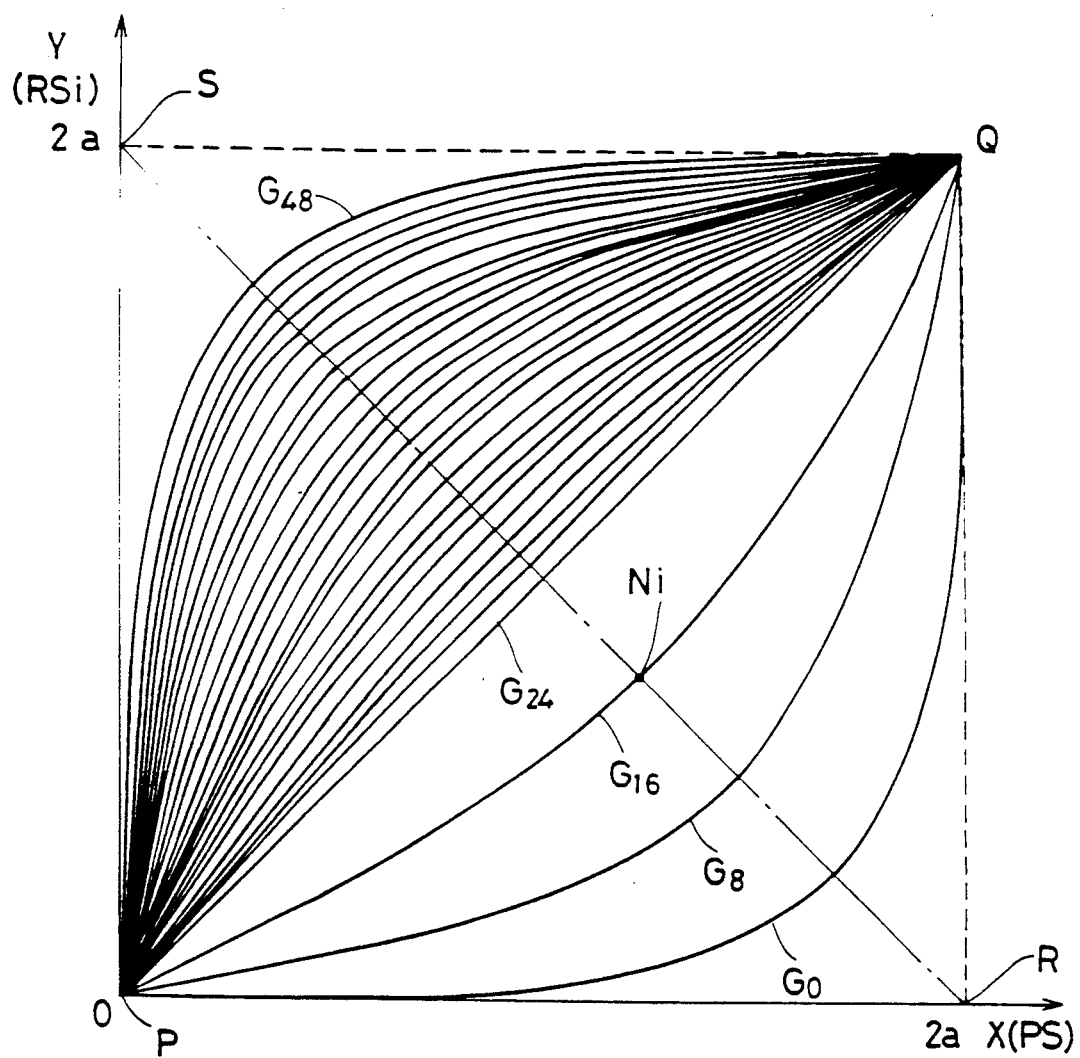
FIG. 5A illustrates graphs showing an example of a plurality of conversion functions.

At a preparation step S11, a plurality of conversion functions $G_i$ are established. Various functions can be employed as the conversion functions $G_i$. The functions shown in FIG. 5A are employed as the conversion functions $G_i$ in the present preferred embodiment. Conversion functions $G_1$ to $G_7$, $G_9$ to $G_{15}$ and $G_{17}$ to $G_{23}$ are not shown in the figure for the purpose of avoiding complicatedness. These functions $G_1$ to $G_7$, $G_9$ to $G_{15}$ and $G_{17}$ to $G_{23}$ correspond to the functions obtained by reflecting conversion functions $G_{47}$ to $G_{41}$, $G_{39}$ to $G_{33}$, and $G_{31}$ to $G_{25}$, respectively, at a plane of mirror symmetry which is a plane vertical to a plane XY on which a conversion function $G_{24}$ is included.

In FIG. 5A, the horizontal axis X represents a processed image signal PS, while the vertical axis Y represents a converted image signal $RS_i$. The conversion function $G_i$ is defined within the following range:

$$0 \leq X \leq 2a \quad (4)$$

$$0 \leq Y \leq 2a \quad (5)$$

$$2a = 256 - 1 \quad (6)$$

Although forty-eight conversion functions $G_i$ are employed in this preferred embodiment, the number of the conversion functions $G_i$ may be arbitrarily increased or decreased as required.

As can be clearly seen from FIG. 5A, all the conversion functions $G_i$ includes common two points, i.e., P(0, 0) and Q(2a, 2a). The conversion function $G_{24}$ is an identical function for converting the processed image signal PS into the converting image signal $RS_{24}$ in a ratio of 1 to 1.

The other conversion functions $G_0$ to $G_{23}$ and $G_{25}$ to $G_{48}$ are symmetrical with respect to the straight line SR which includes two points S (0, 2a) and R (2a, 0). An intersection of the conversion function $G_i$ and the straight line SR is expressed by the symbol $N_i$. Each interval between each adjacent two intersections $N_i$ and $N_{i-1}$ or $N_i$ and $N_{i+1}$ is constant.

A concrete explanation will given below for how to obtain the functional form of each conversion function $G_i$ shown in FIG. 5A.

Figure 5B:
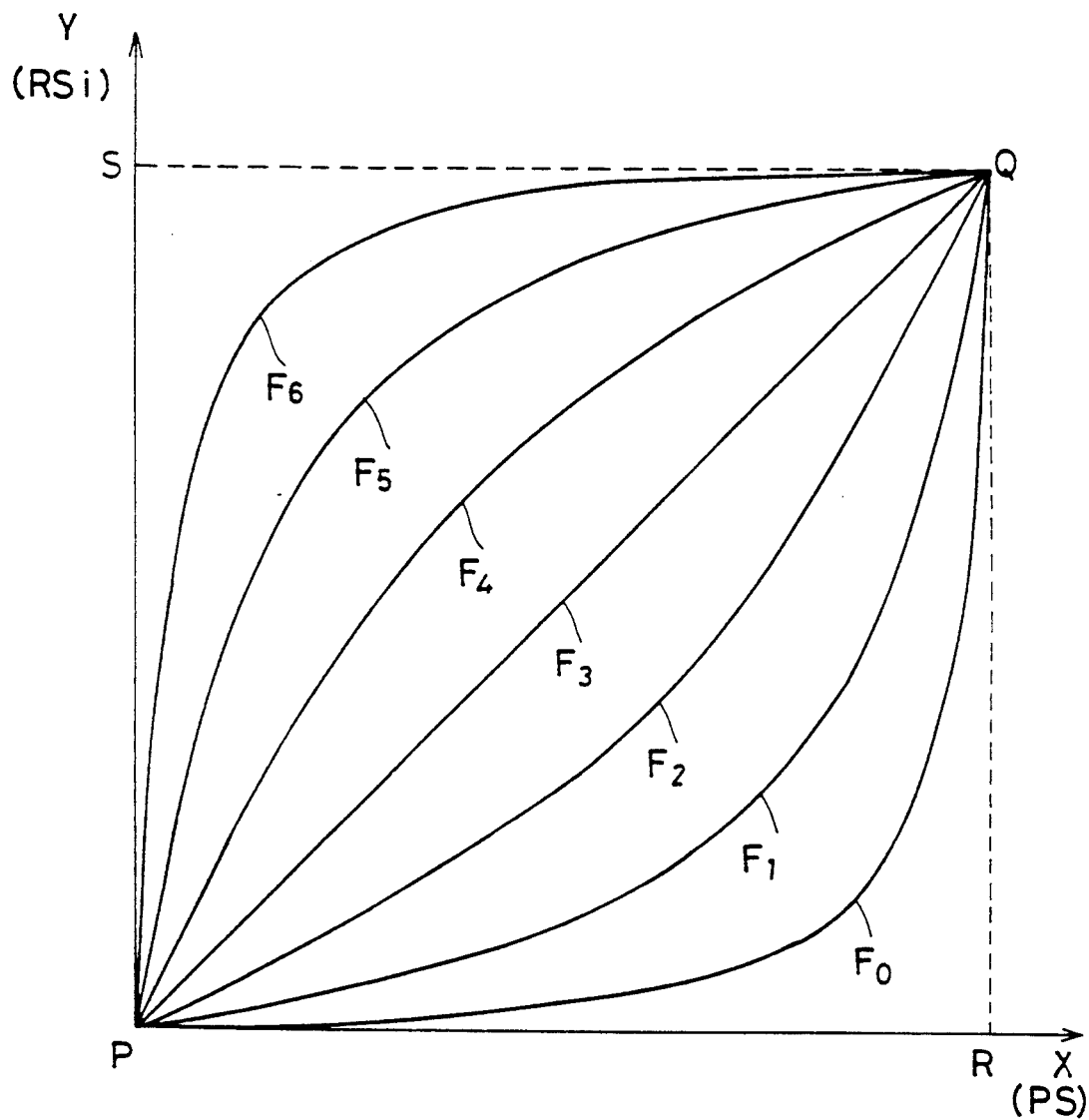
FIG. 5B illustrates graphs showing an example of a plurality of provisional conversion functions.
Figure 5C:
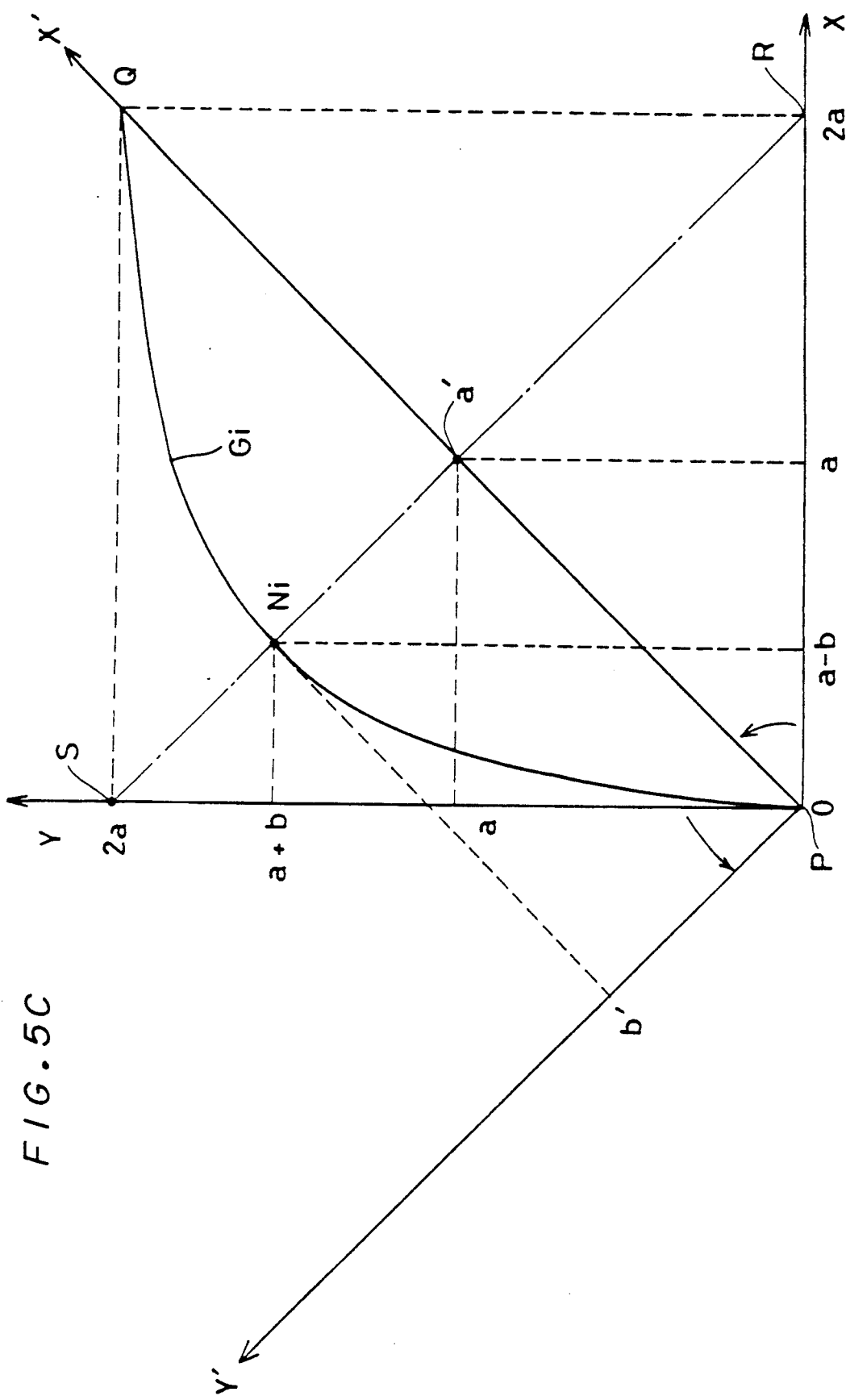
FIG. 5C is an explanatory view employed for explaining one of a plurality of the conversion functions shown in FIG. 5A.

FIG. 5C shows the relations between the conversion function $G_i$ (the conversion function $G_{24}$ is exception) shown in FIG. 5A and coordinate axes X' and Y' which are obtained by rotating the coordinate axes X and Y shown in FIG. 5A by 45° in the counterclockwise direction with the rotation center at the point P. In other words, the conversion function $G_i$ is a parabole with the vertex at the intersection $N_i$ with respect to the coordinate axes X' and Y'. Now, positional coordinates of the intersection $N_i$ with respect to the coordinate axes X and Y are expressed as $N_i(a-b, a+b)$, while those with respect to another coordinate axes X' and Y' are expressed as $N_i(a', b')$. Then, the functional form of the conversion function $G_i$ can be given by following equations (7) to (11), wherein the symbol b is a parameter.

$$Y = -\frac{b'}{a'^2}(X - a')^2 + b' \quad (7)$$

$$a' = \sqrt{2}\, a \quad (8)$$

$$b' = \sqrt{2}\, b \quad (9)$$

$$X = \frac{1}{\sqrt{2}}(X - Y) \quad (10)$$

$$Y = \frac{1}{\sqrt{2}}(X + Y) \quad (11)$$

The functional form of the conversion function $G_i$ can be established by holding the relations defined by these equations (7) to (11) in a memory. Specifically, the conversion function $G_i$ can be established by designating coordinate values (X, Y) to be included in the conversion function $G_i$ as table values, or by designating the parameter b.

Figure 5D:
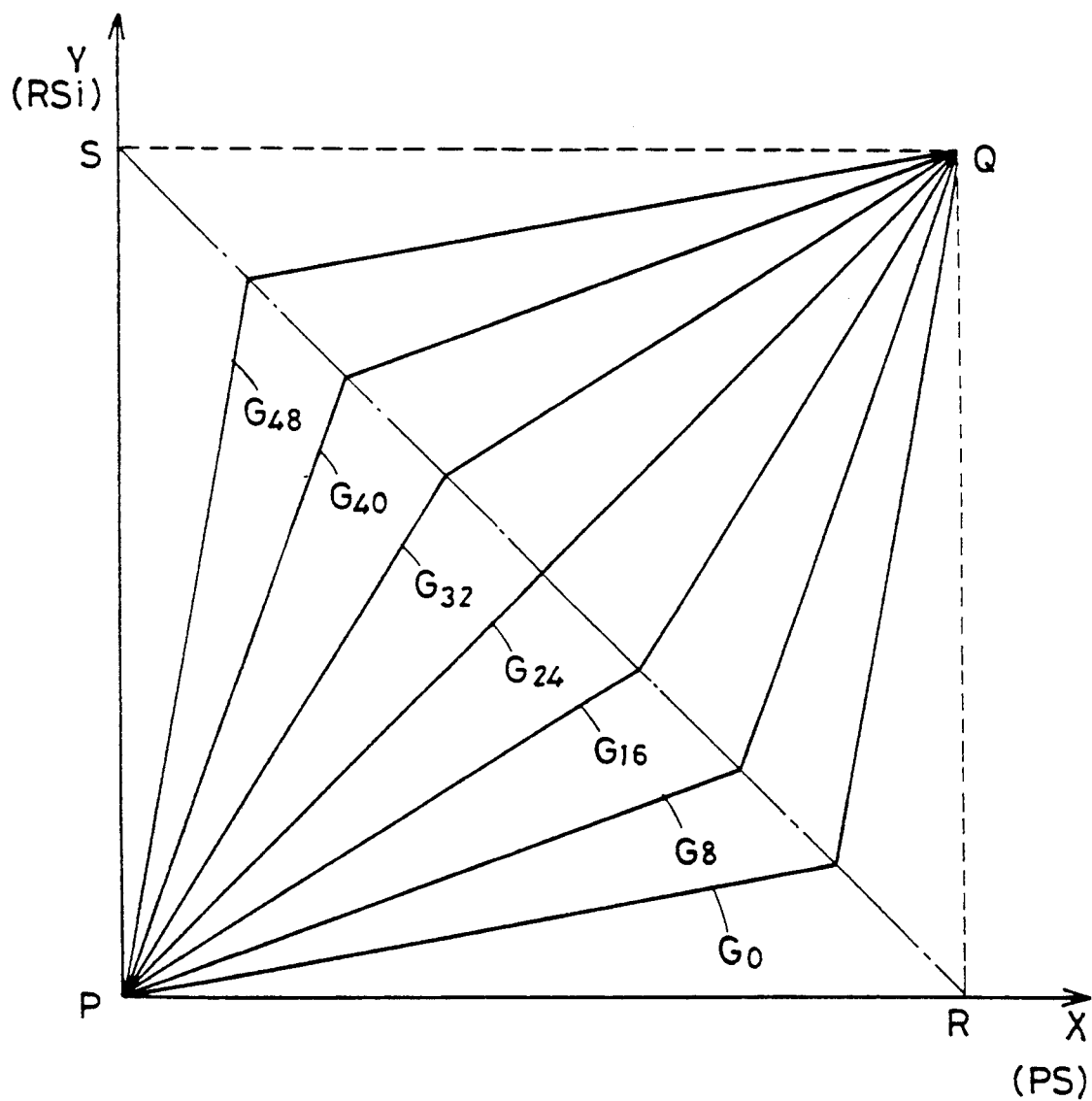
FIG. 5D illustrates graphs showing another example of a plurality of conversion functions.

Employed as the conversion functions $G_i$ in the above-described preferred embodiment are the curves which are symmetrical with respect to the straight line RS, wherein respective second differential coefficients $d^2Y/dX^2$ are always positive or always negative. The conversion functions $G_i$ are not limited to such curves. Broken lines shown in FIG. 5D which are symmetrical with respect to the straight line SR may also be employed as the conversion functions $G_i$. Only main broken lines are shown in FIG. 5D for the purpose of avoiding complicatedness.

In the next step S12, a plurality of the conversion functions are extracted among the conversion functions $G_i$ established in the preceding step S11. These extracted functions are hereafter referred to as provisional conversion functions $F_j$. The number of the provisional conversion functions $F_j$ to be extracted is arbitrary as long as it is smaller than the number of the conversion functions $G_i$.

In the present preferred embodiment, seven provisional conversion functions $F_j$ are extracted, as shown in FIG. 5B. The relation between the conversion functions $G_i$ and the provisional conversion functions $F_j$ can be expressed as follows, where the symbol j is an integer:

$$F_j = G_i \quad (12)$$

$$i = 8 \times j \quad (13)$$

$$0 \leq j \leq 6 \quad (14)$$

The steps S13 to S21 correspond to exposure scanning processes.

First, in the step S13, a reference solid-pixel number $N_{ST}$ in response to the given processed image signal PS is computed for one quarter halftone-dot block OB on the scanning line. The subsequent steps S14 to S19 correspond to a series of processings conducted for this one quarter halftone-dot block QB.

The method of computing the reference solid-pixel number $N_{st}$ will be described later. An explanation is now given for the exposure recording wherein the concept of the reference solid-pixel number $N_{st}$ is not utilized.

Figure 6:
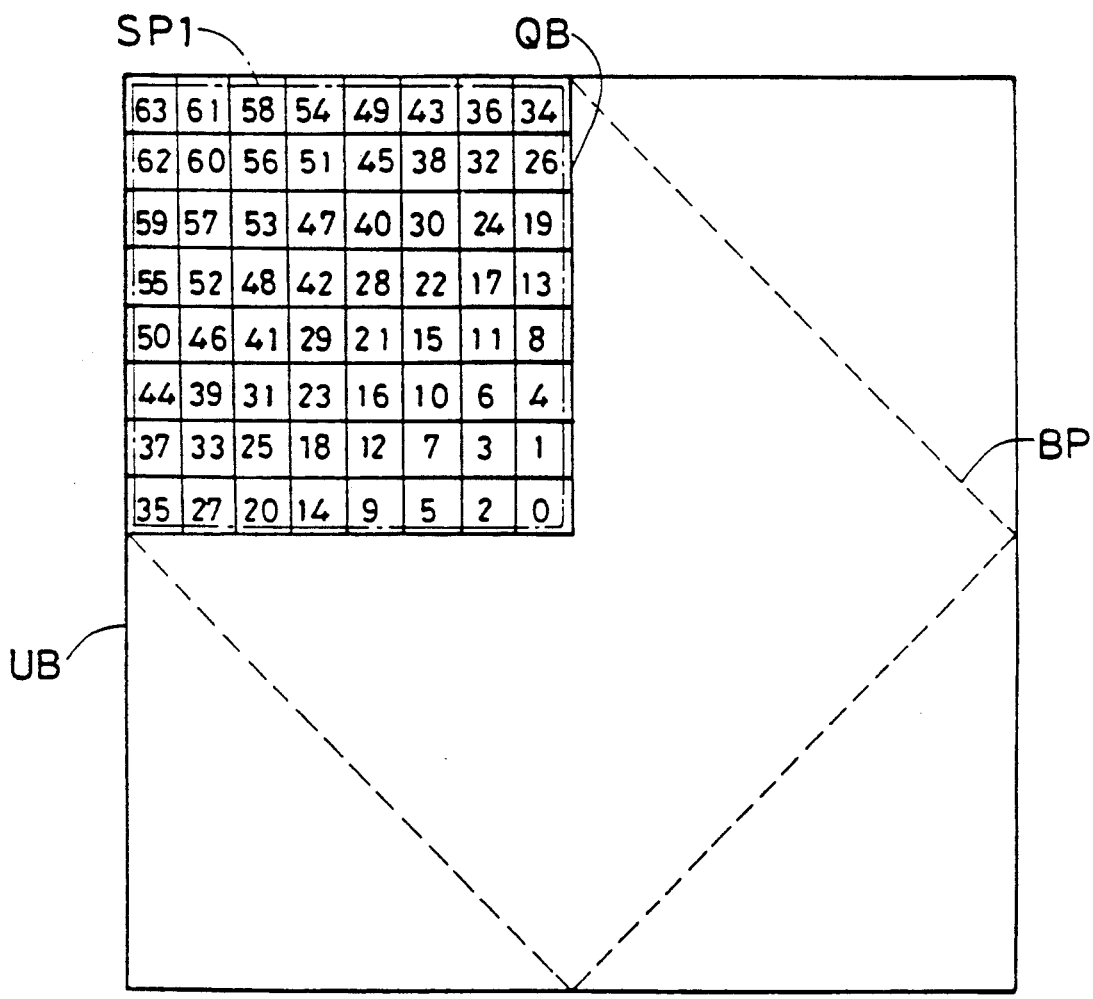
FIG. 6 shows a normal screen threshold pattern.
Figure 7:
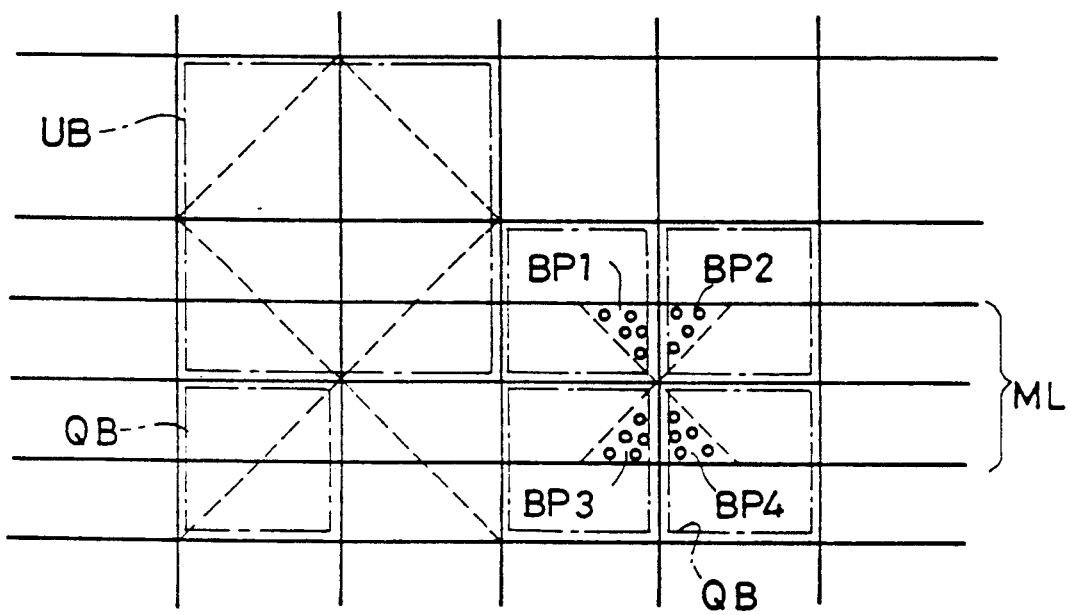
FIG. 7 shows a narrow line on the normal screen threshold pattern.

FIG. 7 shows an example of reproducing a narrow line ML indicating a halftone-dot area ratio of 50% on a unit halftone-dot block UB having a normal screen threshold pattern SP1 shown in FIG. 6.

FIG. 6 shows the screen threshold pattern on the quarter halftone-dot block QB. Screen threshold values D in the other three quarter halftone-dot blocks QB are arranged to be symmetrical to the pattern shown in FIG. 6 with respect to the center of the unit halftone-dot block UB. Dynamic range of the screen threshold value D is between 0 to 63. Accordingly, the screen threshold value D in the solid portion with a halftone-dot area ratio of 50% falls in the range of $D \leq 31$.

In the example shown in FIG. 7, the average image density of each quarter halftone-dot block QB on which the narrow line ML passes is 25% in a solid halftone-dot area percentage. The actual solid halftone-dot area ratio, however, is only 12.5%. Exposed solid portions are represented by the symbols BP1 to BP4. Consequently, a certain measure is required to ensure designated halftone-dot area ratio in processing images such as the narrow line ML.

In the present preferred embodiment, a solid-pixel numbers $N_{BP}$ to be exposed within each quarter halftone-dot block QB is determined by applying the following equation (15) to each quarter halftone-dot block QB:

$$PS_{av}/255 = N_{BP}/N_{TOT} \tag{15}$$

The numeral $PS_{av}$ represents an average value of image signals given for each pixel in each quarter halftone-dot block QB, and is obtained by averaging the image signals. Each of the image signals has a dynamic range of 0 to 255. The numeral $N_{TOT}$ represents the total pixel number within each quarter halftone-dot block QB.

Figure 8:
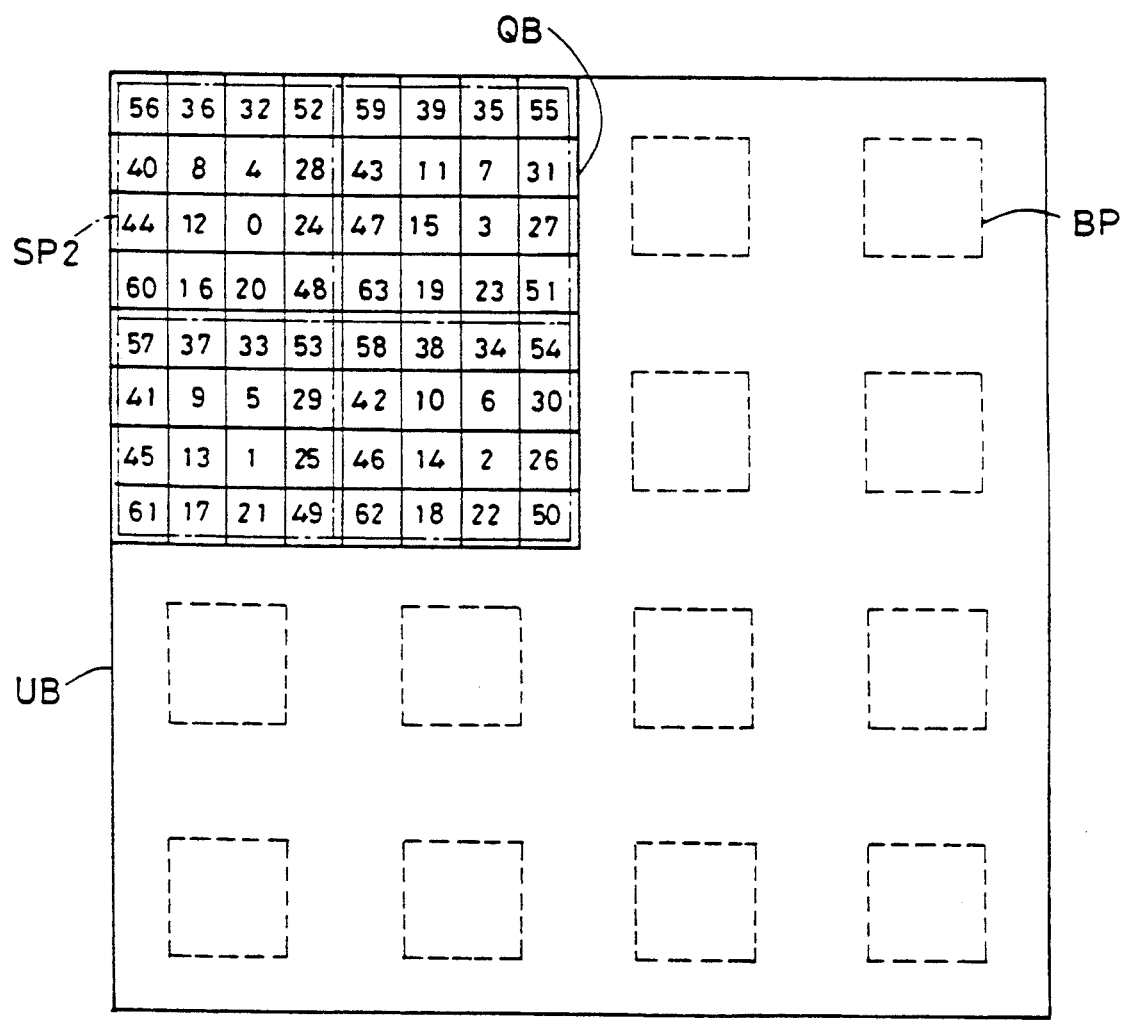
FIG. 8 shows a screen threshold pattern having a short cycle.
Figure 9:
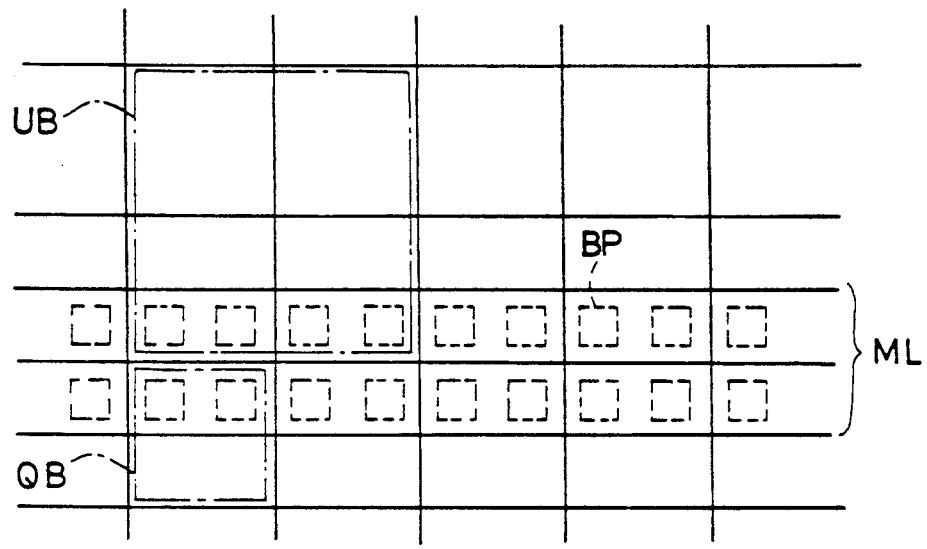
FIG. 9 shows a narrow line on the screen threshold pattern having a short cycle.

In practice, the solid-pixel numbers $N_{BP}$ in each of the quarter halftone-dot blocks QB may be computed as shown in FIG. 9 by applying a screen threshold patterns SP2 of a short period shown in FIG. 8 without employing the above-described computing method, thereby solid-pixel numbers for providing required halftone-dot area ratio may be obtained. In the screen threshold pattern SP2 of a short period, the solid portions BP are arranged in more uniformity on the unit halftone-dot block UB, so that such an approximation can be carried out. In the example shown in FIG. 9, the solid portion BP occupies approximate 25% of the quarter halftone-dot block QB on which the narrow line ML passes.

The solid-pixel numbers $N_{BP}$ thus obtained are memorized as the reference solid-pixel numbers $N_{ST}$ of the corresponding quarter halftone-dot blocks QB.

In the step S14, the converted image signal $RS_j$ is obtained for the said one quarter halftone-dot block QB on the function of the corresponding provisional conversion function $F_j$.

$$RS_j = F_j(PS) \tag{16}$$

In the step S15, a imaginary solid-pixel number $N_{RSj}$ to be formed on the basis of the converted image signal $RS_j$ is computed for the said one quarter halftone-dot block QB by means of imaginary exposure, which will be more fully described later.

In the step S16, the imaginary solid-pixel number $N_{RSj}$ is compared with the reference solid-pixel number $N_{ST}$ for the said one quarter halftone-dot block QB, to thereby presume a conversion function $G_J$, which gives the solid-pixel number most approximate to the reference solid-pixel number $N_{ST}$, among the conversion functions $G_i$. The conversion function $G_J$ is defined as a most-approximate conversion function $H_{QB}$ for the said one quarter halftone-dot block QB. An example is given for the case in which the relations between the reference solid-pixel number $N_{ST}$ and imaginary solid-pixel numbers $N_{RS2}$ and $N_{RS3}$ are given as follows, wherein the imaginary solid-pixel numbers $N_{RS2}$ and $N_{RS3}$ are obtained in response to converted image signal $RS_2$ and $RS_3$ which are converted through provisional conversion functions $F_2$ and $F_3$, respectively,:

$$N_{RS2} < N_{ST} < N_{RS3} \tag{17}$$

In this example, the most-approximate conversion function $H_{QB}$ is a function which interpolates the functions $G_{16}$ and $G_{24}$. The conversion function $G_i$ to serve as the most-approximate conversion function $H_{QB}$ can be presumed by linear interpolation, as described below.

Figure 10:
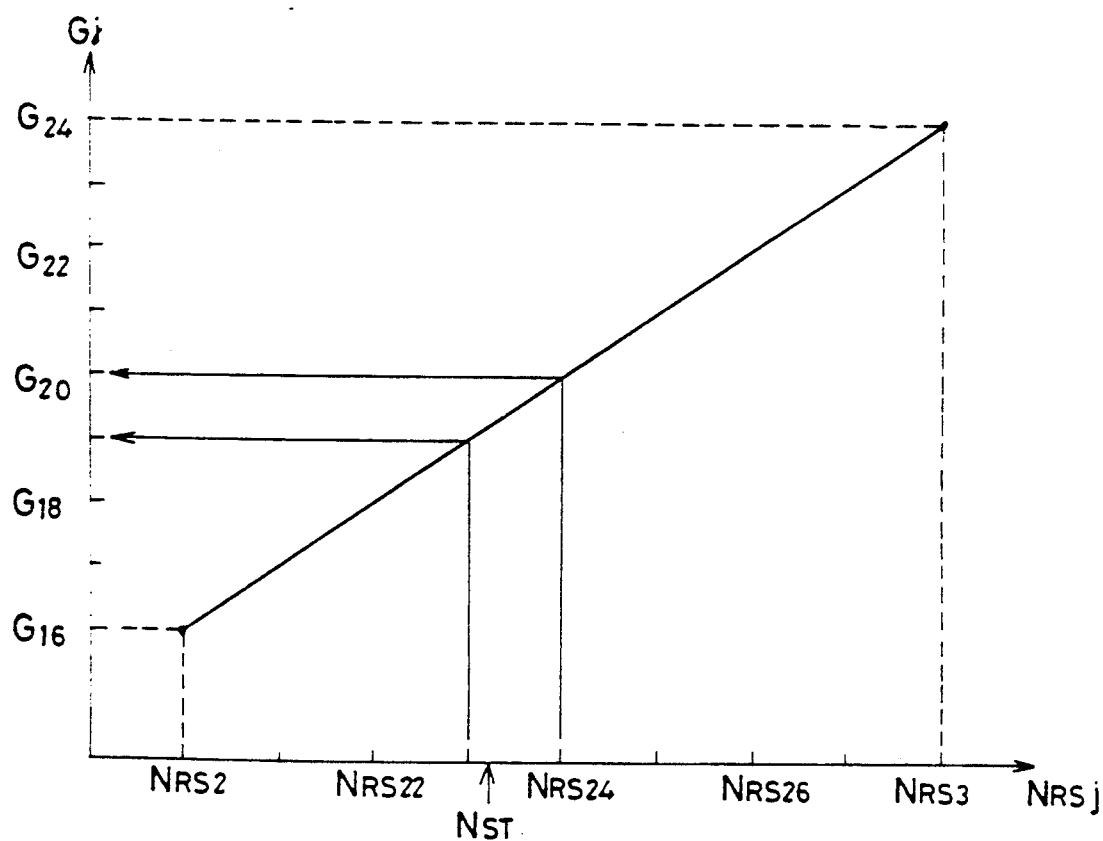
FIG. 10 is an explanatory view showing relations between imaginary solid-pixel numbers and conversion functions.

Now, let us assume that reference solid-pixel number $N_{ST}$ which satisfies the equation (17) is related to the following equations (18) and (19), as shown in FIG. 10:

$$N_{RS23} < N_{ST} < N_{RS24} \tag{18}$$

$$(N_{ST} - N_{RS23}) < (N_{RS24} - N_{ST}) \tag{19}$$

FIG. 10 shows the relations between the imaginary solid-pixel numbers $N_{RS2}$ (a first interpolating solid-pixel number) and $N_{RS3}$ (a second interpolating solid-pixel number) and the conversion functions $G_{16}$ to $G_{24}$. In the figure, the difference between the imaginary solid-pixel numbers $N_{RS2}$ and $N_{RS3}$ is divided into eight equal parts, so that seven interpolation imaginary solid-pixel numbers $N_{RS21}$ to $N_{RS27}$ interpolating the imaginary solid-pixel numbers $N_{RS2}$ and $N_{RS3}$ are shown on the horizontal axis. Assuming that the interpolation imaginary solid-pixel numbers $N_{RS21}$ to $N_{RS27}$ are given by the conversion functions $G_{17}$ to $G_{23}$, respectively, it can be presumed that the conversion function $G_{19}$ corresponds to the conversion function $G_J$, which gives the solid-pixel number most approximate to the reference solid-pixel number $N_{ST}$ satisfying the equations (18) and (19). That is, the relation between the most-approximate conversion function $H_{QB}$ and the conversion function $G_{19}$ can be expressed as follows:

$$H_{QB} = G_{19}(PS) \tag{20}$$

After the most-approximate conversion function $H_{QB}$ is thus defined, the process is proceeded to the step S17. In the step S17, the processed image signal PS is converted through the most-approximate conversion function $H_{QB}$, thereby the converted image signal RS is obtained:

$$RS = H_{QB}(PS) \tag{21}$$

In the step S18, the converted image signal RS is compared with the screen threshold value D, thereby the exposure control signal QS is produced. In the step S19, exposure is carried out for the said one quarter halftone-dot block QB in response to the exposure control signal QS.

In the step S20, it is judged whether or not the current scanning position is a position of an exposure terminal.

When it is judged that the position is not the terminal position, the processing is turned to next quarter halftone-dot block QB (the step S21), and the series of processings corresponding to the steps S13 to S19 is carried out again for the new quarter halftone-dot block QB.

When the position is the terminal position, on the other hand, the series of the processings is terminated.

Thus, error in exposed-area ratio can be restricted in the case of using a normal screen pattern.

FIG. 11A illustrates an example wherein a narrow line ML indicating a halftone-dot area ratio of 50% is exposed without performing conversion processing, and FIG. 11B shows an example wherein the same line ML is exposed after the above-described conversion processing is carried out. Within the narrow line ML, solid portions BP are represented by regions R1 and R7 with circles. In the example shown in FIG. 11A, the regions R1 to R7 have respective areas significantly different from each other. In the example shown in FIG. 11B wherein the conversion process is conducted, however, the regions R1 to R7 have areas approximately equal to each other, respectively. Namely, in the example shown in FIG. 11A, the area of the solid portions BP is too small in the regions R1 to R3, and excessive in the regions R5 and R7. In the example shown in FIG. 11B, on the other hand, the area of the solid portions BP turns to be larger in the regions R1 to R3, and turns to be smaller in the regions R5 to R7 through the conversion processing. In the region R4, the area of the solid portion BP is proper, and therefore is hardly changed. The area of the solid portions BP is thus adjusted properly for each halftone-dot.

Figure 12A:
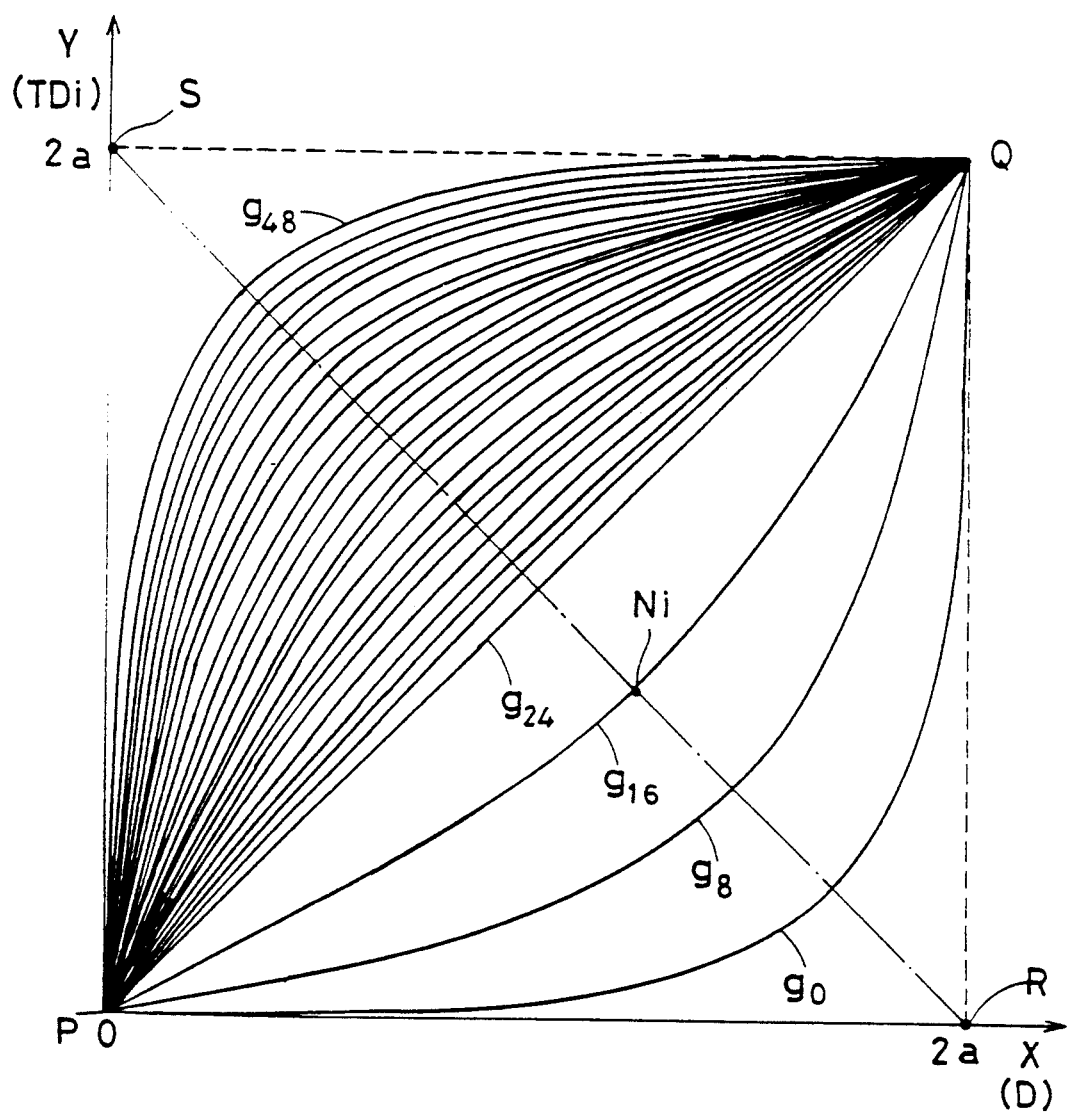
FIG. 12A illustrates graphs showing an example of a plurality of conversion functions in accordance with another preferred embodiment of the present invention.

The above-described conversion may be applied to the screen threshold value D. FIG. 12A shows conversion functions $g_i$ for converting the screen threshold value D corresponding to the conversion functions $G_i$ shown in FIG. 5A. In the figure, the horizontal axis represents the screen threshold values D, while the vertical axis represents the converted screen threshold values $TD_i$. Similar to FIG. 5A, conversion functions $g_1$ to $g_7$, $g_9$ to $g_{15}$, and $g_{17}$ to $g_{23}$ are not shown in FIG. 12A for the purpose of avoiding complicatedness.

Figure 12B:
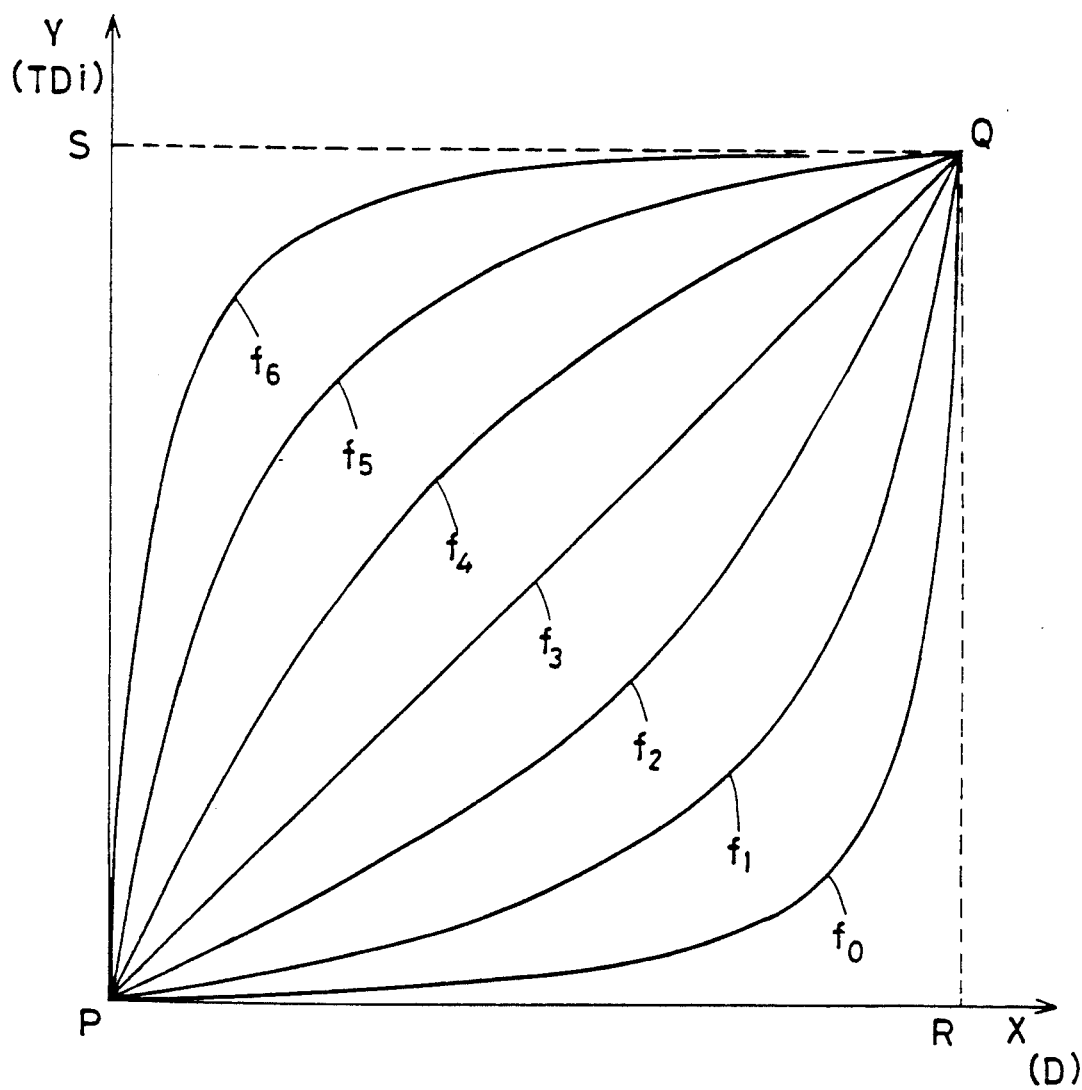
FIG. 12B illustrates graphs showing an example of a plurality of provisional conversion functions in accordance with another embodiment of the present embodiment.

FIG. 12B shows provisional conversion functions $f_j$ for converting the screen threshold value D corresponding to the provisional conversion functions $F_j$ shown in FIG. 5B. The relations between the conversion functions $g_i$ and the provisional conversion functions $f_j$ are similar to the above-described relations between the conversion functions $G_i$ and the provisional conversion functions $F_j$, and can be expressed as follows:

$$f_j = g_i \tag{22}$$

$$i = 8 \times j \tag{23}$$

$$0 \leq j \leq 6 \tag{24}$$

The screen threshold value D is converted into the converted screen threshold value $TD_j$ through the conversion functions $f_j$.

$$TD_j = f_j(D) \quad (j = 0 \text{ to } 6) \tag{25}$$

Then, imaginary solid-pixel numbers $N_{TDj}$ are computed as a function of the converted screen threshold values $TD_j$ for each quarter halftone-dot block QB. Each of the computed imaginary virtual solid pixel numbers $N_{TDj}$ are compared with the reference solid-pixel number $N_{ST}$, thereby the most-approximate conversion function $H_{QB}$ is presumed among the conversion functions $g_i$. This procedure is similar to that of the above-described conversion processing for converting the processed image signal PS.

The screen threshold value D is converted through the most-approximate conversion function $H_{QB}$ which has been obtained through the above-described procedure, and then, the converted screen threshold value TD is compared with the processed image signal PS, thereby an exposure control signal QS' is produced. Similar to the above-described conversion processing for converting the processed image signal PS, errors in halftone-dot area ratio can be restricted by performing exposure in response to the exposure control signal QS'.

D. Imaginary Exposure

It is required in the present invention to compute the imaginary solid-pixel numbers $N_{RSj}$ by converting the processed image signal PS through a plurality of the provisional conversion functions $F_j$ for each divided halftone-dot block. In order to smoothly carry out this computation, imaginary exposure is performed with an imaginary beam in the present preferred embodiment. The imaginary solid-pixel numbers $N_{RSj}$ during this imaginary exposure are computed for each quarter halftone-dot block QB, and the computed numbers $N_{RSj}$ are stored in a memory to be used in actual exposure.

The reference solid-pixel number $N_{ST}$ is also calculated by the similar imaginary exposure for each quarter halftone-dot block QB, and the calculated numbers are stored in the memory.

The imaginary virtual beam precedes the actual exposure beam by at least a diagonal length of the quarter halftone-dot block QB in a subscanning line Y (see FIG. 1). Accordingly, the reference solid-pixel number $N_{ST}$ and the imaginary solid-pixel number $N_{RS}$ have been already calculated for the quarter halftone-dot block QB on which the actual exposure beam is scanning.

In the present preferred embodiment, the imaginary beam precedes the actual exposure beam by n pixels in the subscanning direction Y. The value of n is selected to be the smallest integer satisfying the condition that a product of n and P is greater than the length of the diagonal of the quarter halftone-dot block QB, where P indicates the length of one side of the pixel PX shown in FIG. 3A.

It is not necessary that the memory for storing the reference solid-pixel number $N_{ST}$ and the imaginary solid-pixel numbers $N_{RSj}$ for each quarter halftone-dot block QB has the capacity to store all those numbers $N_{ST}$ and $N_{STj}$ for all the quarter halftone-dot blocks QB on the entire surface of the film 600 (see FIG. 1).

More specifically, when the angle $\theta$ between the two coordinate axes satisfies the condition that $-45° \leq \theta < 45°$ or $135° \leq \theta < 225°$, the coordinate $QB_X$ may be transformed as: $QB_x = QB_x \cdot \text{mod} 4$. Even though the coordinates $QB_x$, $QB_y$ are taken as the quarter halftone-dot block coordinates, each quarter halftone-dot block QB can be identified even if another quarter halftone-dot block QB has the same block coordinates. On the other hand, when the angle $\theta$ satisfies the condition that $45° \leq \theta < 135°$ or $225° \leq \theta < 315°$, the coordinate $QB_y$ is transformed as: $QB_y = QB_y \cdot \text{mod} 4$, thereby the coordinates $QB_x$, $QB_y$ are taken as the quarter halftone-dot block coordinates.

Such coordinate transformation reduces memory capacity in a great degree.

The above-described memory has flag bit of one bit in addition to the stored bits of the imaginary solid-pixel numbers $N_{RSj}$ and the reference solid-pixel number $N_{ST}$. The function of this flag in calculation of the reference solid-pixel number $N_{ST}$ and the imaginary solid-pixel numbers $N_{RSj}$ is to clear the contents of the memory into 0 for a new quarter halftone-dot block QB, so that solid-pixel numbers for the new quarter halftone-dot block QB can be calculated.

E. Circuit Structure

Figure 13:
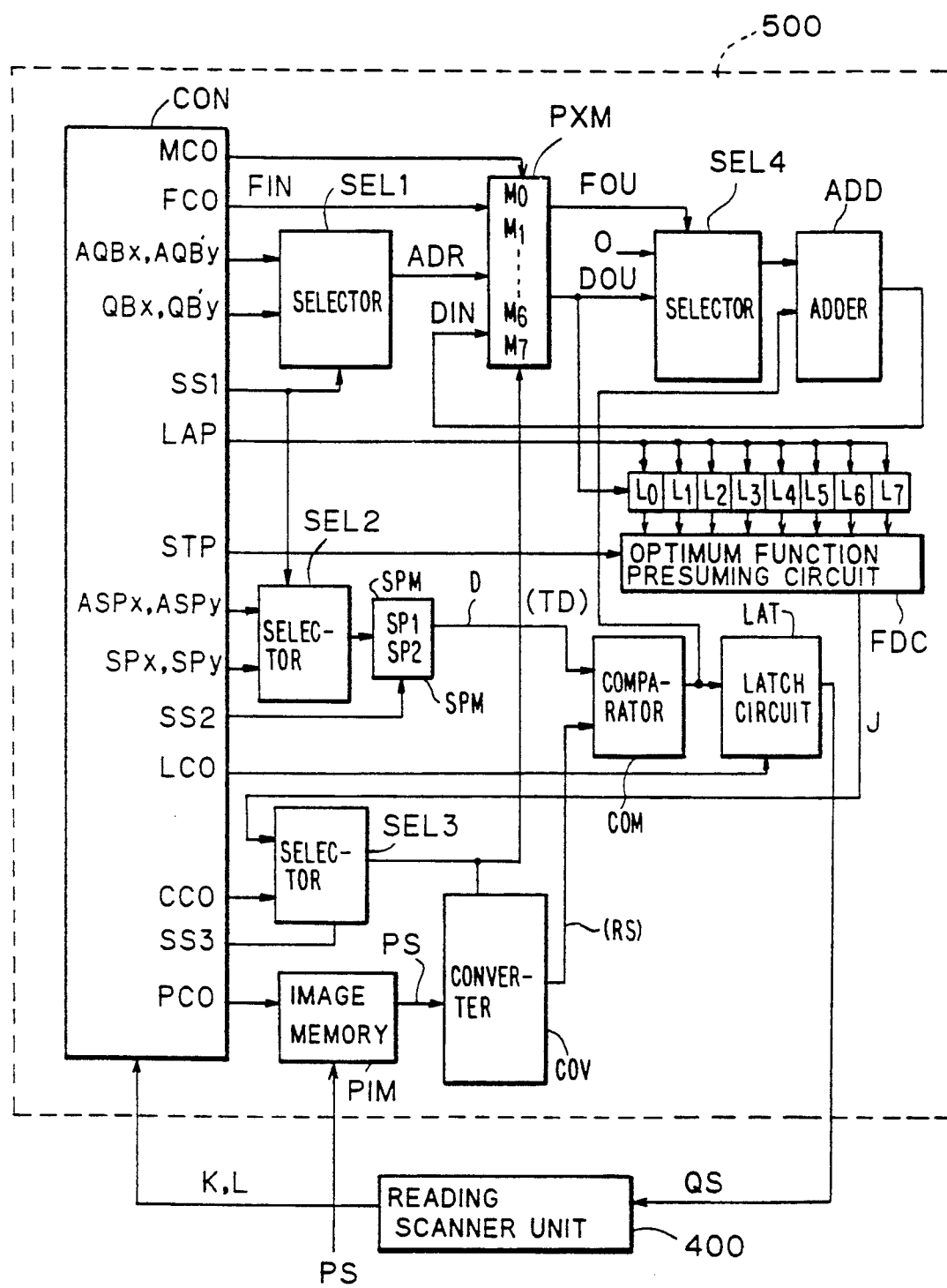
FIG. 13 is a circuit diagram showing a halftone-dot generator in accordance with an embodiment of the present invention.

FIG. 13 is a block diagram showing the halftone-dot generator 500 having a digital-circuit structure according to a preferred embodiment of the present invention, in which the processed image signal PS is converted.

The quarter halftone-dot block coordinates $QB_x$, $QB_y$ for actual exposure and the screen pattern coordinates $SP_x$, $SP_y$ for actual exposure are calculated in a hardware controller CON as a function of the film coordinates $F_x$, $F_y$ of the exposure beam.

Quarter halftone-dot block coordinates $AQB_x$, $AQB_y$ for imaginary exposure and screen pattern coordinates $ASP_x$, $ASP_y$ for imaginary exposure are also calculated in the hardware controller CON as a function of the film coordinates $F_x$, $F_{(y+n)}$ of the imaginary beam.

A pixel memory PXM comprises memory elements $M_0$ to $M_7$. The memory elements $M_0$ to $M_6$ store the imaginary solid-pixel numbers $N_{RSj}$, which are obtained as a function of the converted image signals $RS_j$ converted through the provisional conversion functions $F_j$ shown in FIG. 5B, respectively. The memory element $M_7$ stores the reference solid-pixel number $N_{ST}$.

In this pixel memory PXM, all flags for the memory elements $M_0$ to $M_7$ are set to 0 in response to a memory control signal MCO prior to exposure scanning.

During the exposure scanning, a series of operations described below is carried out for every new film coordinates $F_x$, $F_y$.

First, a first selector SEL1 selects the quarter halftone-dot block coordinates $AQB_x$, $AQB_y$ for imaginary exposure in response to a first select signal SS1. The quarter halftone-dot block coordinates $AQB_x$, $AQB_y$ serve as an address ADR of the pixel memory PXM.

The memory element $M_0$ is read out in response to the address ADR. A fourth selector SEL4 selects "0" when a flag output FOU is "0". When the flag output FOU is "1", the fourth selector SEL4 selects the output DOU which is read out from the memory element $M_0$. The selected value "0" or the selected output DOU is inputted to an adder ADD.

On the other hand, a second selector SEL2 selects the screen pattern coordinates $ASP_x$, $ASP_y$ for imaginary exposure in response to said first select signal SS1 and outputs the same. The screen pattern coordinates $ASP_x$, $ASP_y$ serve as an address of a screen threshold memory SPM.

This memory SPM stores a first periodic threshold pattern SP1 having a normal repetition period corresponding to the halftone dot pitch proportional to the size of the unit halftone-dot block UB, and a second periodic threshold pattern SP2 having a short repetition period corresponding to the halftone dot pitch proportional to the size of the quarter halftone-dot block QB. In the present invention, the term "periodic threshold pattern" is used to represent not only a pattern including a plurality of unit periodic patterns but also a pattern having only one unit pattern which is repeatedly read out from the memory to generate a periodic pattern.

In response to a second select signal SS2, the first threshold pattern SP1 is selected in the first place, and the screen threshold value D of the first threshold pattern SP1 is outputed.

At the same time, a third selector SEL3 selects a conversion control signal CCO generated from the hardware controller CON in response to a third select signal SS3, and supply the same to said pixel memory PXM and a converter COV.

In this converter COV, the processed image signal PS is converted through the provisional conversion function $F_0$ in response to the conversion control signal CCO, and outputs the converter signal as a converted image signal $RS_0$. The image signal PS is read out from an image memory PIM in response to an image memory control signal PCO. The converter COV may be easily constructed as a memory of look-up table type.

The converted image signal $RS_0$ thus obtained and the screen threshold value D are inputed to the comparator COM to be compared with each other therein.

When the converted image signal $RS_0$ is equal to or larger than the screen threshold value D ($RS_0 \geq D$), the comparator COM outputs "1". When this condition is not satisfied, the comparator COM outputs "0". The output is supplied to the adder ADD.

This adder ADD performs the addition, and outputs DIN. Based on the output DIN, the memory element $M_0$ is rewritten. At the same time, a flag controller FCO supplies a flag input having a value of "1", thereby the flag of the memory element $M_0$ is set at "1".

Through the above-described operations, renewal of the memory element $M_0$ of the pixel memory PXM, i.e., calculation and storage of the imaginary pixel number $N_{RSO}$ are completed for the processed image signal converted through provisional conversion function $F_0$.

Through the similar procedure, the other memory elements $M_1$ to $M_6$ of the pixel memory PXM are renewed, wherein the provisional conversion functions $F_1$ to $F_6$ are employed, respectively. Thus, the respective imaginary solid-pixel numbers $N_{RSj}$ corresponding to the provisional conversion functions $F_j$ are calculated. These processings correspond to the step S11 to S15 in FIG. 4.

Renewal of the memory element $M_7$, i.e., calculation of the reference solid-pixel number $N_{ST}$ (corresponding to the step S13 in FIG. 4) is also performed in the similar manner. In this case, however, the processed image signal PS is converted through the provisional conversion function $F_3$. That is, the processed image signal PS is not converted. Furthermore, the second threshold pattern SP2 having a short repetition cycle is selected among the two patterns SP1 and SP2 of the screen threshold memory SPM.

Then, the first select signal SS1 is switched, and the first selector SEL1 selects the quarter halftone-dot block coordinates $QB_x$, $QB_y$ for actual exposure, and employs the same as the address ADR of the pixel memory PXM.

In response to this address ADR, the imaginary solid-pixel numbers $N_{RSj}$ are sequentially read out from the memory elements $M_0$ to $M_6$, and then, the reference solid pixel number $N_{ST}$ is read out from the memory element $M_7$. The imaginary solid-pixel numbers $N_{RSj}$ and the reference solid-pixel number $N_{ST}$ are stored in resisters $L_0$ to $L_7$, in synchronism with a latch pulse LAP. At this time, each of the flags in the pixel memory PXM is rewrittened to "0".

When the resisters $L_0$ to $L_7$ are filled with the data $N_{RSj}$ and $N_{ST}$, an optimum function presuming circuit FDC operates in response to a starting pulse STP. The optimum function presuming circuit FDC outputs a distinguish signal J for specifying a conversion function which is presumed to give the solid-pixel number most approximate to the reference solid-pixel number $N_{ST}$. This distinguish signal J is obtained by linear interpolation as follows:

There is always one imaginary solid-pixel number $N_{RSj}$ whose relation with the reference solid-pixel number $N_{ST}$ satisfies the following condition;

$$(N_{RSj}-N_{ST})\cdot(N_{RSj+1}-N_{ST})\leq 0 \qquad (26)$$

Since the subscript j can be related to the subscript i of the conversion function $G_i$ by the equation (13), the distinguish signal J, which corresponds to the subscript of the conversion function for giving the solid-pixel number most approximate to the reference solid-pixel number $N_{ST}$, can be given by the following equation:

$$J = \text{INT}\left[8 \times \frac{\overline{ER} \cdot j + \underline{ER} \cdot (j+1)}{\overline{ER} + \underline{ER}}\right] \quad (27)$$

where $$\overline{ER} = N_{RSj+1} - N_{ST} \quad (28)$$

$$\underline{ER} = N_{ST} - N_{RSj} \quad (29)$$

The function INT(x) converts a real number x into an integer, wherein fraction of 0.5 and over is counted as one and the rest is cut away.

When the reference solid-pixel number $N_{ST}$ is smaller than the lower limit value $N_{RS0}$ or is larger than the upper limit value $N_{RS6}$ of the imaginary solid-pixel numbers $N_{RSj}$, the distinguish signal J is determined by the following equations (30) or (31):

$$N_{RS0} \geq N_{ST} \rightarrow J = 0 \quad (30)$$

$$N_{ST} \geq N_{RS6} \rightarrow J = 48 \quad (31)$$

Then, the distinguish signal J thus determined is supplied to the third selecter SEL3. At this time, the third select signal SS3 is switched, thereby the distinguish signal J is selected in the third selecter SEL3 to be inputted in the converter COV. In response to the signal J, the corresponding conversion function $G_J$ is selected as the most-approximate conversion function $H_{QB}$ (the step S16 in FIG. 4).

Then, the processed image signal PS is converted through the selected conversion function $G_J$ (the step S17 in FIG. 4), and the converted image signal RS is inputted to the comparator COM.

At this time, the second selecter SEL2 selects the screen pattern coordinates $SP_x$, $SP_y$ for actual exposure and outputs the same. The coordinates $SP_x$, $SP_y$ serve as an address, thereby the screen threshold value D is read out from the first threshold pattern SP1 to be inputted to the comparator COM.

In this comparator COM, "1" is outputted when the condition that RS ≧ D is satisfied, while "0" is outputted in other cases.

The output of the comparator COM is latched in a latch circuit LAT in synchronism with a latch control signal LCO, and then, led to the recording scanner unit 400 as the expose control signal QS. The steps S11 through S18 in FIG. 4 are thus completed.

The above-mentioned series of operations is repeatedly conducted for each renewal of the film coordinates $F_x$, $F_y$, and a vivid halftone image is produced.

Figure 14:
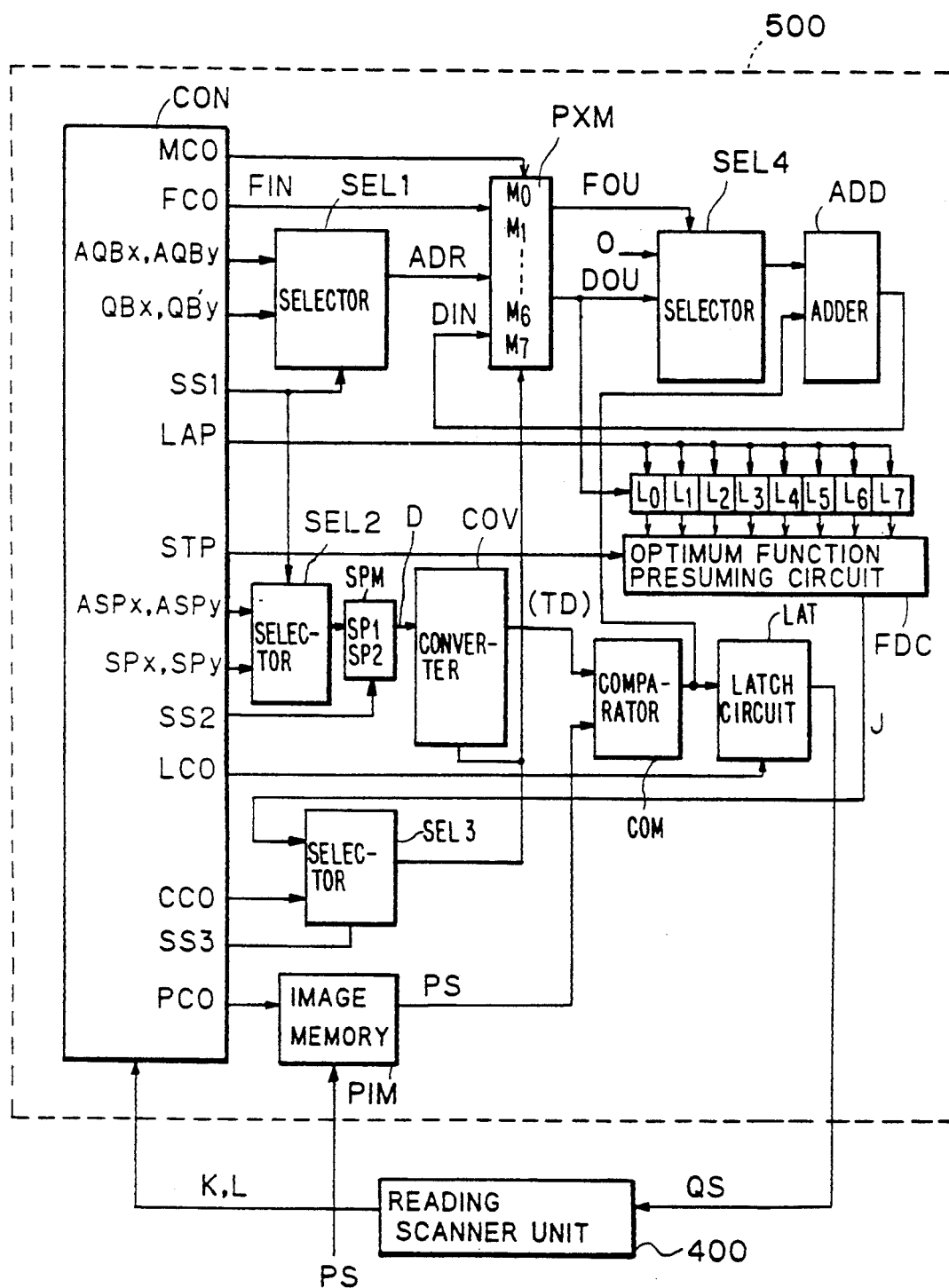
FIG. 14 is a circuit diagram showing a halftone-dot generator in accordance with another embodiment of the present invention.

FIG. 14 is a block diagram showing a circuit structure of the halftone generator 500, wherein the screen threshold value D is converted. The processed image signal PS is inputted directly from the image memory PIM to the comparator COM. The screen threshold value D from the screen threshold memory SPM is converted into a converted screen threshold value TD in the converter COV, and thereafter inputted to the comparator COM. The converter COV stores the conversion functions $g_i$ shown in FIG. 12A and the provisional conversion functions $f_j$ shown in FIG. 12B. Other structures and operations are similar to those in the example shown in FIG. 13 wherein the image signal PS is converted.

F. Modifications (1) In the above-described preferred embodiment, the present invention is applied to a print scanner. The present invention, however, is not limited to be applied to the print scanner, but may also be applied to a device for optically reproducing an image signal such as a laser printer, for example.

Figure 15:
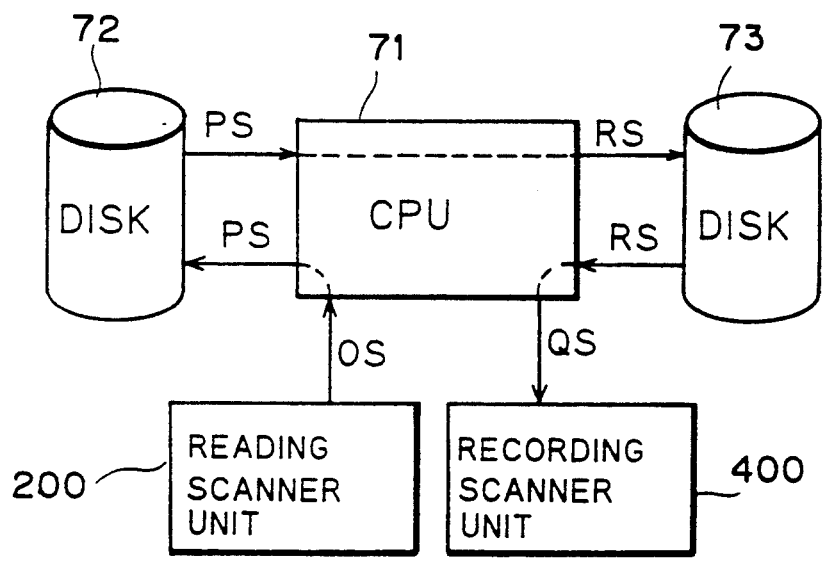
FIG. 15 shows a structure of an image processor to which a modification of the present invention is applied.

(2) FIG. 15 is a conceptual view showing an image processer using a recording medium, according to another preferred embodiment of the present invention.

An image signal OS obtained by a reading scanner unit 200 is inputted to a CPU 71 to be converted into a processed image signal PS. This processed image signal PS is temporarily stored in a disk 72.

In performing conversion, the processed image signal PS is read out from the disk 72 to be subjected to the above-described processings in the hardware circuit in the CPU 71 according to a programming corresponding to the flow chart in FIG. 4. The processed image signal PS is thus converted into a converted image signal RS in the CPU 71. The converted image signal RS outputted from the CPU 71 is stored in another disk 73. The converted image signal RS is read out from the disk 73 as required, and converted into an exposure control signal QS to be supplied to a recording scanner unit.

Calculation and exposure may thus be independently conducted.

While the invention has been shown and described in detail, the foregoing description is in all aspects illustrative and not restrictive. It is therefore understood that numerous modifications and variations can be devised without departing from the scope of the invention.

I claim:

1. A method of obtaining a halftone image on a photosensitive material, wherein said halftone image consists of recorded pixels exposed to light modulated in response to a control signal, said method comprising the steps of:

(a) obtaining screen pattern data consisting of threshold values;

(b) preparing three or more conversion functions having a predetermined correlation therebetween;

(c) selecting only a part of said conversion functions to obtain two or more provisional conversion functions;

(d) generating an image signal representing an original image for each pixel;

(e) defining an array of unit areas on said photosensitive material and dividing each unit area into a plurality of divided areas;

(f) counting the number of first recorded pixels expected to be obtained in each divided area if said image signal is converted through each of said provisional conversion functions to obtain converted signals and an halftone dot image is recorded on said photosensitive material at a first halftone dot pitch proportional to a size of each unit area through comparison of said converted signals with said threshold values, to thereby obtain number values for respective conversion functions;

(g) counting the number of second recorded pixels expected to be obtained in each divided area if a halftone dot image is recorded on said photosensitive material as a function of said image signal at a second halftone dot pitch corresponding to a size of each divided area, to thereby obtain a reference number value;

(h) comparing each of said respective number values with said reference number value;

(i) selecting one of said conversion functions for each divided area which is expected to provide recorded pixels in each divided area whose number is most approximate to said reference number value among said conversion functions, wherein the selection of said one of said conversion functions is attained with reference to the result of comparison in the step (h) and said correlation between said conversion functions;

(j) converting said image signal through said one of said conversion functions to obtain a converted image signal;

(k) comparing said converted image signal with said threshold values to obtain said control signal; and (l) exposing said photosensitive material to said light while modifying said light in accordance with said control signal to obtain a halftone dot image on said photosensitive material.

2. The method of claim 1, wherein:

said step (a) comprises the steps of:

(a-1) obtaining said screen pattern data as first screen pattern data consisting of first periodic threshold values having a first period proportional to said first halftone dot pitch; and (a-2) obtaining second screen pattern data consisting of second periodic threshold values having a second period proportional to said second halftone dot pitch; and said step (f) comprises the steps of:

(f-1) converting said image signal through respective provisional conversion functions to obtain converted provisional image signals; and (f-2) comparing said converted provisional image signals with said first periodic threshold values in each divided area to obtain said respective number values; and said step (g) comprises the steps of:

(g-1) comparing said image signal with said second periodic threshold values in each divided area to obtain said reference number value.

3. The method of claim 2, wherein:

said step (b) comprises the step of:

(b-1) defining conversion lines representative of said conversion functions in a rectangular region having four apexes of:

(0, 0), (0,A), (A, 0) and (A, A)

on a two-dimensional conversion coordinate plane such that each conversion lines connects diagonal two apexes within said four apexes, where A is a non-zero value.

4. The method of claim 3, wherein:

said step (b-1) comprises the step of:

(b-1-1) defining said conversion lines such that said conversion lines intersect a straight line connecting said diagonal two apexes, wherein respective intersections of said conversion lines and said straight line are aligned on said straight line at a same interval.

5. The method of claim 4, wherein:

said step (b-1-1) comprises the steps of:

(b-1-1-1) defining a straight conversion line connecting said diagonal apexes; and (b-1-1-2) defining one or more pairs of conversion curves connecting said diagonal two apexes, wherein each pair of conversion curves are substantially symmetrical with respect to said straight line;

wherein:

said conversion lines representative of said conversion functions consist of said straight conversion line and said one or more pairs of conversion curves; and said straight conversion line represents an identical conversion function.

6. The method of claim 5, wherein:

said step (b-1-1-2) comprises the step of:

defining one or more pairs of parabolic curves each having a principal axis on said straight line to obtain said one or more pairs of conversion curves.

7. The method of claim 6, wherein:

said step (h) comprises the step of:

(h-1) determining two of said respective number values between which said reference number value falls, to obtain first and second number values; and said step (i) comprises the steps of:

(i-1) interpolating a difference between said first and second number values to obtain interpolated number values which are related to non-selected conversion functions which are not selected in the step (c) among said conversion functions, respectively;

(i-2) comparing said first and second number values and interpolated number values with said reference number value to select a most-approximate number value which is most approximate to said reference number value among said first and second number values and interpolated number values; and (i-3) extracting a conversion function corresponding to said most-approximate number value from said conversion functions to thereby obtain said one of said conversion functions.

8. The method of claim 7, wherein:

said step (i) further comprises the steps of:

(i-4) selecting a maximum number value among said number values and selecting a conversion function corresponding to said maximum number value among said conversion functions as said one of said conversion functions if said reference number value is larger than all of said number values; and (i-5) selecting a minimum number value among said number values and selecting a conversion function corresponding to said minimum number value among said conversion functions as said one of said conversion functions if said reference number value is smaller than all of said number values.

9. The method of claim 4, wherein:

said step (b-1-1) comprises the steps of (b-1-1-3) defining a straight conversion line connecting said diagonal apexes; and (b-1-1-4) defining one or more pairs of kinked conversion lines connecting said diagonal two apexes, wherein each pair of kinked conversion lines are substantially symmetrical with respect to said straight line;

wherein:

said conversion lines representative of said conversion functions consist of said straight conversion line and said one or more pairs of kinked conversion lines; and said straight conversion line represents an identical conversion function.

10. A method of obtaining a halftone image on a photosensitive material, wherein said halftone image consists of recorded pixels exposed to light modulated in response to a control signal, said method comprising the steps of:

(a) obtaining screen pattern data consisting of threshold values;
(b) preparing three or more conversion functions having a predetermined correlation therebetween;
(c) selecting only a part of said conversion functions to obtain two or more provisional conversion functions;
(d) generating an image signal representing an original image for each pixel;
(e) defining an array of unit areas on said photosensitive material and dividing each unit area into a plurality of divided areas;
(f) counting the number of first recorded pixels expected to be obtained in each divided area if said threshold values are converted through each of said provisional conversion functions to obtain converted thresholds and an halftone dot image is recorded on said photosensitive material at a first halftone dot pitch proportional to a size of each unit area through comparison of said image signal with said converted thresholds, to thereby obtain number values for respective conversion functions;
(g) counting the number of second recorded pixels expected to be obtained in each divided area if a halftone dot image is recorded on said photosensitive material as a function of said image signal at a second halftone dot pitch corresponding to a size of each divided area, to thereby obtain a reference number value;
(h) comparing each of said respective number values with said reference number value;
(i) selecting one of said conversion functions for each divided area which is expected to provide recorded pixels in each divided area whose number is most approximate to said reference number value among said conversion functions, wherein the selection of said one of said conversion functions is attained with reference to the result of comparison in the step (h) and said correlation between said conversion functions;
(j) converting said threshold values through said one of said conversion functions to obtain converted threshold values;
(k) comparing said image signal with said converted threshold values to obtain said control signal; and
(l) exposing said photosensitive material to said light while modifying said light in accordance with said control signal to obtain a halftone dot image on said photosensitive material.

11. The method of claim 10, wherein:
said step (a) comprises the steps of:
(a-1) obtaining said screen pattern data as first screen pattern data consisting of first periodic threshold values having a first period proportional to said first halftone dot pitch; and
(a-2) obtaining second screen pattern data consisting of second periodic threshold values having a second period proportional to said second halftone dot pitch; and
said step (f) comprises the steps of:
(f-1) converting said first periodic threshold values through respective provisional conversion functions to obtain converted provisional threshold values; and (f-2) comparing said image signal with said converted provisional threshold values in each divided area to obtain said respective number values; and
said step (g) comprises the steps of:
(g-1) comparing said image signal with said second periodic threshold values in each divided area to obtain said reference number value.

12. The method of claim 11, wherein:
said step (b) comprises the step of:
(b-1) defining conversion lines representative of said conversion functions in a rectangular region having four apexes of:

$(0, 0)$ $(0, A)$, $(A, 0)$ and $(A, A)$ on a two-dimensional conversion coordinate plane such that each conversion lines connects diagonal two apexes within said four apexes, where A is a non-zero value.

13. The method of claim 12, wherein:
said step (b-1) comprises the step of:
(b-1-1) defining said conversion lines such that said conversion lines intersect a straight line connecting said diagonal two apexes, wherein respective intersections of said conversion lines and said straight line are aligned on said straight line at a same interval.

14. The method of claim 13, wherein:
said step (b-1-1) comprises the steps of:
(b-1-1-1) defining a straight conversion line connecting said diagonal apexes; and
(b-1-1-2) defining one or more pairs of conversion curves connecting said diagonal two apexes, wherein each pair of conversion curves are substantially symmetrical with respect to said straight line;
wherein:
said conversion lines representative of said conversion functions consist of said straight conversion line and said one or more pairs of conversion curves; and
said straight conversion line represents an identical conversion function.

15. The method of claim 14, wherein:
said step (b-1-1-2) comprises the step of:
defining one or more pairs of parabolic curves each having a principal axis on said straight line to obtain said one or more pairs of conversion curves.

16. The method of claim 15, wherein:
said step (h) comprises the step of:
(h-1) determining two of said respective number values between which said reference number value falls, to obtain first and second number values; and
said step (i) comprises the steps of:
(i-1) interpolating a difference between said first and second number values to obtain interpolated number values which are related to non-selected conversion functions which are not selected in the step (c) among said conversion functions, respectively;
(i-2) comparing said first and second number values and interpolated number values with said reference number value to select a most-approximate number value which is most approximate to said reference number value among said first and second number values and interpolated number values; and
(i-3) extracting a conversion function corresponding to said most-approximate number value from said conversion functions to thereby obtain said one of said conversion functions.

17. The method of claim 16, wherein:
said step (i) further comprises the steps of:
(i-4) selecting a maximum number value among said number values and selecting a conversion function corresponding to said maximum number value among said conversion functions as said one of said conversion functions if said reference number value is larger than all of said number values; and
(i-5) selecting a minimum number value among said number values and selecting a conversion function corresponding to said minimum number value among said conversion functions as said one of said conversion functions if said reference number value is smaller than all of said number values.

18. The method of claim 13, wherein:
said step (b-1-1) comprises the steps of
(b-1-1-3) defining a straight conversion line connecting said diagonal apexes; and
(b-1-1-4) defining one or more pairs of kinked conversion lines connecting said diagonal two apexes, wherein each pair of kinked conversion lines are substantially symmetrical with respect to said straight line;
wherein:
said conversion lines representative of said conversion functions consist of said straight conversion line and said one or more pairs of kinked conversion lines; and
said straight conversion line represents an identical conversion function.

19. An apparatus for obtaining a halftone image on a photosensitive material, wherein said halftone image consists of recorded pixels exposed to light modulated in response to a control signal, said apparatus comprising:
(a) means for holding screen pattern data consisting of threshold values;
(b) means for holding function data representative of three or more conversion functions having a predetermined correlation therebetween, only a part of which conversion functions are selected as two or more provisional conversion functions;
(c) means for generating an image signal representing an original image for each pixel;
(d) means for defining an array of unit areas on said photosensitive material and a plurality of divided areas obtained by dividing each unit area;
(e) means for counting the number of first recorded pixels expected to be obtained in each divided area if said image signal is converted through each of said provisional conversion functions to obtain converted signals and an halftone dot image is recorded on said photosensitive material at a first halftone dot pitch proportional to a size of each unit area through comparison of said converted signals with said threshold values, to thereby obtain number values for respective conversion functions;
(f) means for counting the number of second recorded pixels expected to be obtained in each divided area if a halftone dot image is recorded on said photosensitive material as a function of said image signal at a second halftone dot pitch corresponding to a size of each divided area, to thereby obtain a reference number value;
(g) means for comparing each of said respective number values with said reference number value;
(h) means for selecting one of said conversion functions for each divided area which is expected to provide recorded pixels in each divided area whose number is most approximate to said reference number value among said conversion functions, wherein the selection of said one of said conversion functions is attained with reference to the result of comparison in the means (g) and said correlation between said conversion functions;
(i) means for converting said image signal through said one of said conversion functions to obtain a converted image signal;
(j) means for comparing said converted image signal with said threshold values to obtain said control signal; and
(k) means for exposing said photosensitive material to said light while modifying said light in accordance with said control signal to obtain a halftone dot image on said photosensitive material.

20. The apparatus of claim 19, wherein:
said means (a) comprises:
(a-1) means for holding said screen pattern data as first screen pattern data consisting of first periodic threshold values having a first period proportional to said first halftone dot pitch; and
(a-2) means for holding second screen pattern data consisting of second periodic threshold values having a second period proportional to said second halftone dot pitch; and
said means (e) comprises:
(e-1) means for converting said image signal through respective provisional conversion functions to obtain converted provisional image signals; and
(e-2) means for comparing said converted provisional image signals with said first periodic threshold values in each divided area to obtain said respective number values; and
said means (f) comprises:
(f-1) means for comparing said image signal with said second periodic threshold values in each divided area to obtain said reference number value.

21. The apparatus of claim 20, wherein:
said means (b) comprises:
(b-1) means for holding conversion lines representative of said conversion functions in a rectangular region having four apexes of:

(0, 0), (0,A), (A, 0) and (A, A)

on a two-dimensional conversion coordinate plane such that each conversion lines connects diagonal two apexes within said four apexes, where A is a non-zero value.

22. The apparatus of claim 21, wherein:
said means (b-1) comprises:
(b-1-1) means for holding said conversion lines so that said conversion lines intersect a straight line connecting said diagonal two apexes, wherein respective intersections of said conversion lines and said straight line are aligned on said straight line at a same interval.

23. The apparatus of claim 22, wherein:
said means (b-1-1) comprises:
(b-1-1-1) means for holding a straight conversion line connecting said diagonal apexes; and (b-1-1-2) means for holding one or more pairs of conversion curves connecting said diagonal two apexes, wherein each pair of conversion curves are substantially symmetrical with respect to said straight line;

wherein:

said conversion lines representative of said conversion functions consist of said straight conversion line and said one or more pairs of conversion curves; and said straight conversion line represents an identical conversion function.

24. The apparatus of claim 23, wherein:

said means (b-1-1-2) comprises:

means for holding one or more pairs of parabolic curves each having a principal axis on said straight line as said one or more pairs of conversion curves.

25. The apparatus of claim 24, wherein:

said means (g) comprises:

(g-1) means for determining two of said respective number values between which said reference number value falls, to obtain first and second number values; and said means (h) comprises:

(h-1) means for interpolating a difference between said first and second number values to obtain interpolated number values which are related to non-selected conversion functions which are not included in said provisional conversion functions among said conversion functions, respectively;

(h-2) means for comparing said first and second number values and interpolated number values with said reference number value to select a most-approximate number value which is most approximate to said reference number value among said first and second number values and interpolated number values; and (h-3) means for extracting a conversion function corresponding to said most-approximate number value from said conversion functions to thereby obtain said one of said conversion functions.

26. The apparatus of claim 25, wherein:

said means (h) further comprises:

(h-4) means for selecting a maximum number value among said number values and selecting a conversion function corresponding to said maximum number value among said conversion functions as said one of said conversion functions if said reference number value is larger than all of said number values; and (h-5) means for selecting a minimum number value among said number values and selecting a conversion function corresponding to said minimum number value among said conversion functions as said one of said conversion functions if said reference number value is smaller than all of said number values.

27. The apparatus of claim 22, wherein:

said means (b-1-1) comprises:

(b-1-1-3) means for holding a straight conversion line connecting said diagonal apexes; and (b-1-1-4) means for holding one or more pairs of kinked conversion lines connecting said diagonal two apexes, wherein each pair of kinked conversion lines are substantially symmetrical with respect to said straight line;

wherein:

said conversion lines representative of said conversion functions consist of said straight conversion line and said one or more pairs of kinked conversion lines; and said straight conversion line represents an identical conversion function.

28. An apparatus of obtaining a halftone image on a photosensitive material, wherein said halftone image consists of recorded pixels exposed to light modulated in response to a control signal, said apparatus comprising:

(a) means for obtaining screen pattern data consisting of threshold values;

(b) means for holding function data representative of three or more conversion functions having a predetermined correlation therebetween, only a part of which conversion functions are selected as two or more provisional conversion functions;

(c) means for generating an image signal representing an original image for each pixel;

(d) means for defining an array of unit areas on said photosensitive material and a plurality of divided areas obtained by dividing each unit area;

(e) means for counting the number of first recorded pixels expected to be obtained in each divided area if said threshold values are converted through each of said provisional conversion functions to obtain converted thresholds and an halftone dot image is recorded on said photosensitive material at a first halftone dot pitch proportional to a size of each unit area through comparison of said image signal with said converted thresholds, to thereby obtain number values for respective conversion functions;

(f) means for counting the number of second recorded pixels expected to be obtained in each divided area if a halftone dot image is recorded on said photosensitive material as a function of said image signal at a second halftone dot pitch corresponding to a size of each divided area, to thereby obtain a reference number value;

(g) means for comparing each of said respective number values with said reference number value;

(h) means for selecting one of said conversion functions for each divided area which is expected to provide recorded pixels in each divided area whose number is most approximate to said reference number value among said conversion functions, wherein the selection of said one of said conversion functions is attained with reference to the result of comparison in the means (g) and said correlation between said conversion functions;

(i) means for converting said threshold values through said one of said conversion functions to obtain converted threshold values;

(j) means for comparing said image signal with said converted threshold values to obtain said control signal; and (k) means for exposing said photosensitive material to said light while modifying said light in accordance with said control signal to obtain a halftone dot image on said photosensitive material.

29. The apparatus of claim 28, wherein:

said means (a) comprises:

(a-1) means for holding said screen pattern data as first screen pattern data consisting of first periodic threshold values having a first period proportional to said first halftone dot pitch; and (a-2) means for holding second screen pattern data consisting of second periodic threshold values having a second period proportional to said second halftone dot pitch; and said means (e) comprises:

(e-1) means for converting said first periodic threshold values through respective provisional conversion functions to obtain converted provisional threshold values; and (e-2) means for comparing said image signal with said converted provisional threshold values in each divided area to obtain said respective number values; and said means (p) comprises:

(F-1) means for comparing said image signal with said second periodic threshold values in each divided area to obtain said reference number value.

30. The apparatus of claim 29, wherein:

said means (b) means for comprises the means of:

(b-1) means for holding conversion lines representative of said conversion functions in a rectangular region having four apexes of:

(0, 0), (0,A), (A, 0) and (A, A)

on a two-dimensional conversion coordinate plane such that each conversion lines connects diagonal two apexes within said four apexes, where A is a non-zero value.

31. The apparatus of claim 30, wherein:

said means (b-1) comprises:

(b-1-1) means for holding said conversion lines so that said conversion lines intersect a straight line connecting said diagonal two apexes, wherein respective intersections of said conversion lines and said straight line are aligned on said straight line at a same interval.

32. The apparatus of claim 31, wherein:

said means (b-1-1) comprises:

(b-1-1-1) means for holding a straight conversion line connecting said diagonal apexes; and (b-1-1-2) means for holding one or more pairs of conversion curves connecting said diagonal two apexes, wherein each pair of conversion curves are substantially symmetrical with respect to said straight line;

wherein:

said conversion lines representative of said conversion functions consist of said straight conversion line and said one or more pairs of conversion curves; and said straight conversion line represents an identical conversion function.

33. The apparatus of claim 32, wherein:

said means (b-1-1-2) comprises:

means for holding one or more pairs of parabolic curves each having a principal axis on said straight line as said one or more pairs of conversion curves.

34. The apparatus of claim 33, wherein:

said means (g) comprises:

(g-1) means for determining two of said respective number values between which said reference number value falls, to obtain first and second number values; and said means (h) comprises:

(h-1) means for interpolating a difference between said first and second number values to obtain interpolated number values which are related to non-selected conversion functions which are not included in said provisional conversion functions among said conversion functions, respectively;

(h-2) means for comparing said first and second number values and interpolated number values with said reference number value to select a most-approximate number value which is most approximate to said reference number value among said first and second number values and interpolated number values; and (h-3) means for extracting a conversion function corresponding to said most-approximate number value from said conversion functions to thereby obtain said one of said conversion functions.

35. The apparatus of claim 34, wherein:

said means (h) means further comprises:

(h-4) means for selecting a maximum number value among said number values and selecting a conversion function corresponding to said maximum number value among said conversion functions as said one of said conversion functions if said reference number value is larger than all of said number values; and (h-5) means for selecting a minimum number value among said number values and selecting a conversion function corresponding to said minimum number value among said conversion functions as said one of said conversion functions if said reference number value is smaller than all of said number values.

36. The apparatus of claim 31, wherein:

said means (b-1-1) comprises:

(b-1-1-3) means for holding a straight conversion line connecting said diagonal apexes; and (b-1-1-4) means for holding one or more pairs of kinked conversion lines connecting said diagonal two apexes, wherein each pair of kinked conversion lines are substantially symmetrical with respect to said straight line;

wherein:

said conversion lines representative of said conversion functions consist of said straight conversion line and said one or more pairs of kinked conversion lines; and said straight conversion line represents an identical conversion function.

* * * * *